United States Patent
Kitsunai

(10) Patent No.: US 11,886,335 B2
(45) Date of Patent: Jan. 30, 2024

(54) MEMORY SYSTEM AND CONTROLLING METHOD OF PERFORMING REWRITE OPERATION AT MAXIMUM REWRITE SPEED

(71) Applicant: Kioxia Corporation, Tokyo (JP)

(72) Inventor: Kazuya Kitsunai, Fujisawa Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/839,301

(22) Filed: Jun. 13, 2022

(65) Prior Publication Data

US 2023/0185469 A1 Jun. 15, 2023

(30) Foreign Application Priority Data

Dec. 14, 2021 (JP) ................................. 2021-202630

(51) Int. Cl.
*G06F 12/02* (2006.01)

(52) U.S. Cl.
CPC .. *G06F 12/0246* (2013.01); *G06F 2212/7202* (2013.01)

(58) Field of Classification Search
CPC .............. G06F 12/0246; G06F 2212/7202
See application file for complete search history.

(56) References Cited

U.S. PATENT DOCUMENTS

| | | | |
|---|---|---|---|
| 9,129,699 B2 | 9/2015 | Suzuki et al. | |
| 9,741,436 B2 | 8/2017 | Goss et al. | |
| 2009/0172267 A1 | 7/2009 | Oribe et al. | |
| 2019/0043556 A1* | 2/2019 | Golez | .............. G11C 11/40603 |

FOREIGN PATENT DOCUMENTS

| | | |
|---|---|---|
| JP | 2012-168685 A | 9/2012 |
| JP | 5567263 B2 | 8/2014 |
| JP | 5629391 B2 | 11/2014 |

* cited by examiner

*Primary Examiner* — Chie Yew
(74) *Attorney, Agent, or Firm* — Allen & Overy LLP

(57) ABSTRACT

According to one embodiment, a controller manages a first block set being a set of blocks in which a remaining time is a first time and a second block set being a set of blocks in which a remaining time is a second time. The controller calculates a first rewrite speed based on the first time and a number of blocks included in the first block set. The controller calculates a second rewriting speed based on the second time and a sum of the number of blocks included in the first block set and the number of blocks included in the second block set. The controller determines a maximum rewriting speed among the first rewrite speed and the second rewriting speed. The controller performs the rewrite operation at the determined maximum rewrite speed.

20 Claims, 22 Drawing Sheets

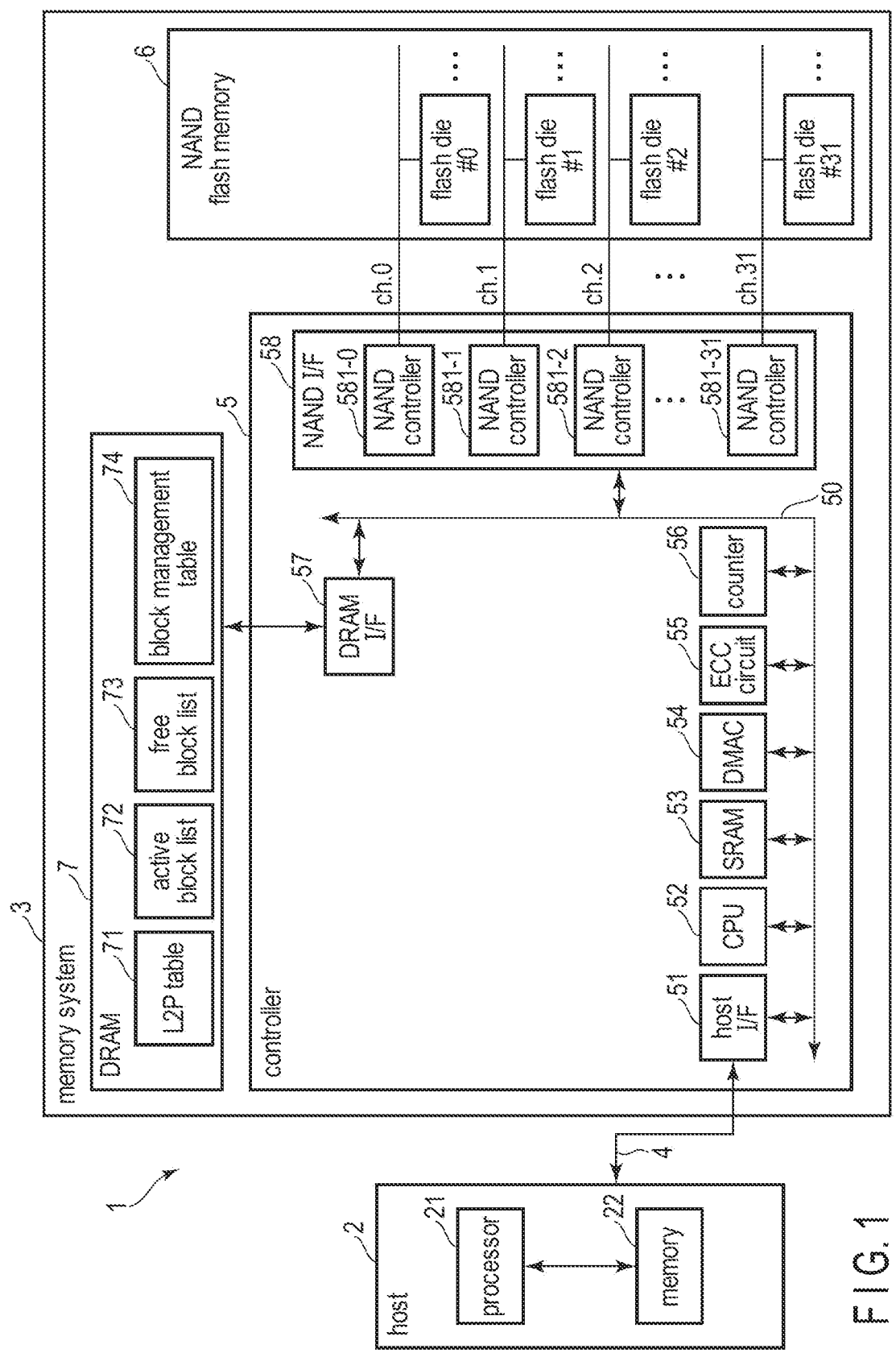
F I G. 1

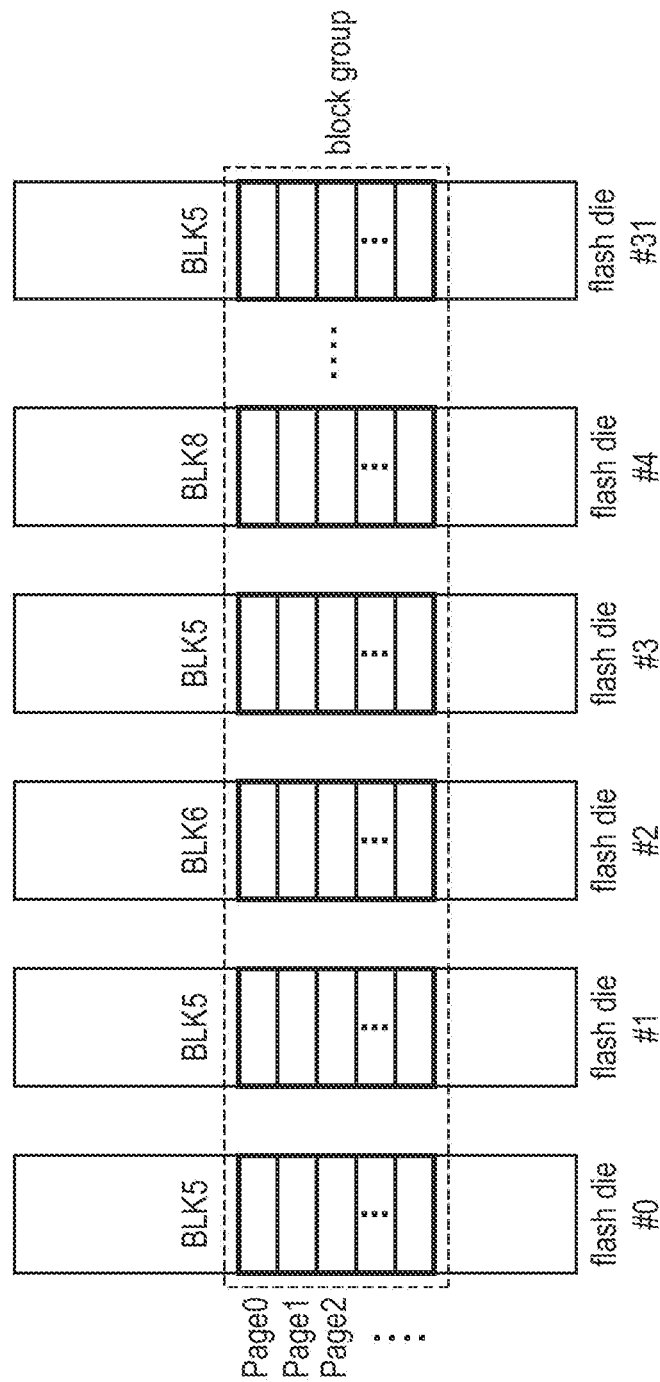
F I G. 3

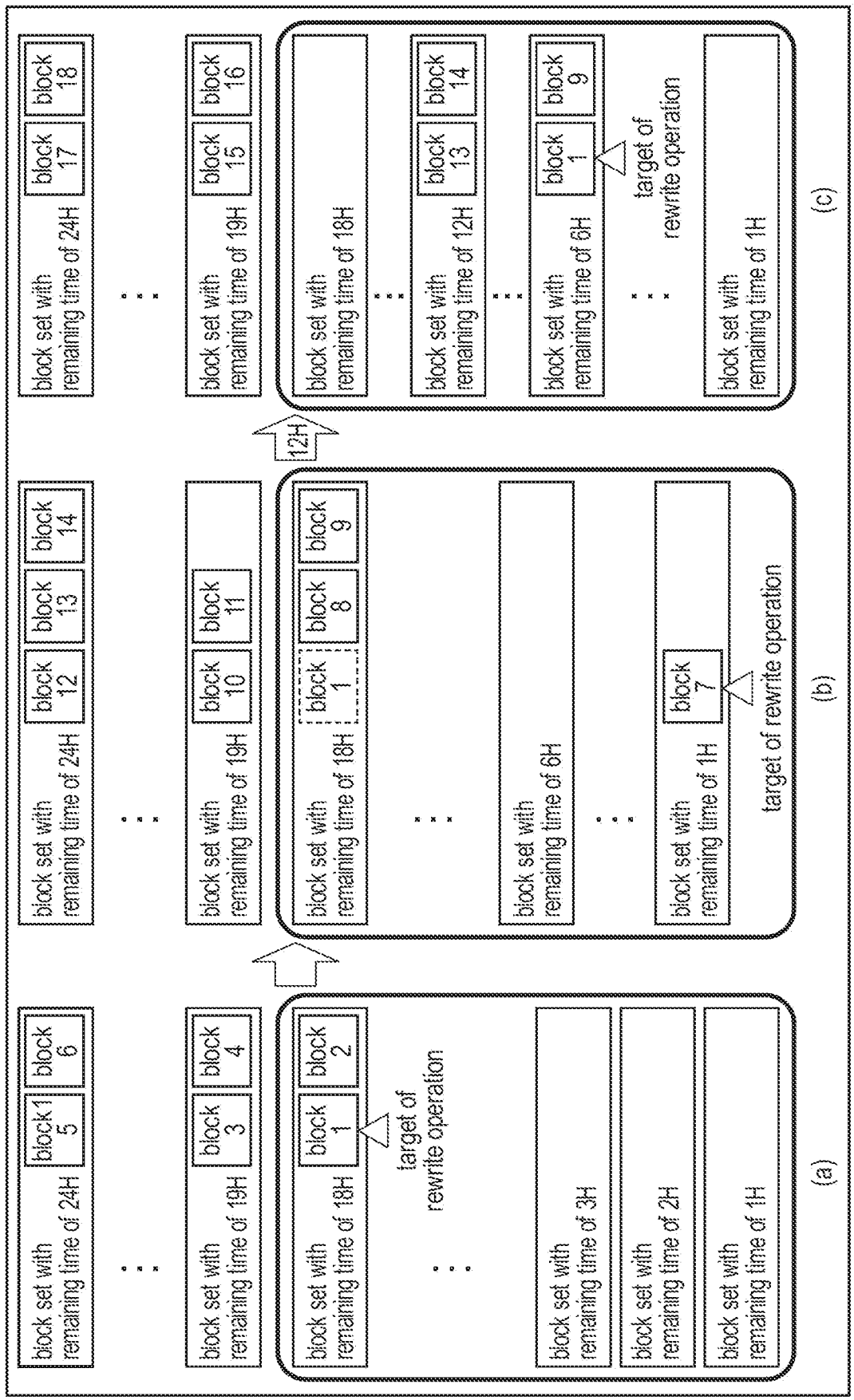
F I G. 10

| block ID | remaining time | attribute | exclusion time | ... |
|---|---|---|---|---|
| block 1 | 24H | Cold | 18H | ... |
| block 2 | 14H | Hot | 7H | ... |
| block 3 | 9H | Cold | 6H | ... |
| block 4 | 5H | Hot | 7H | ... |
| ⋮ | ⋮ | ⋮ | ⋮ | ⋮ |
| | | | | ... |

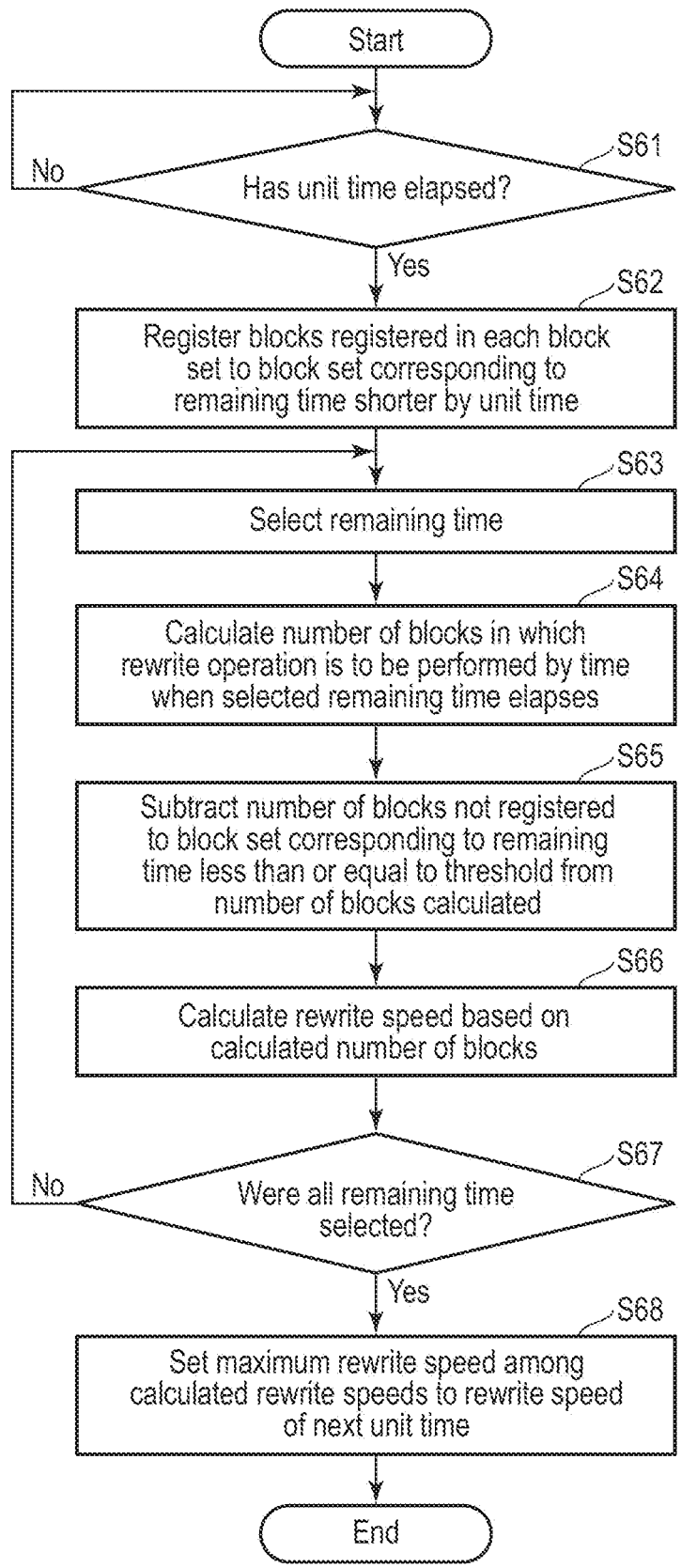
F I G. 20

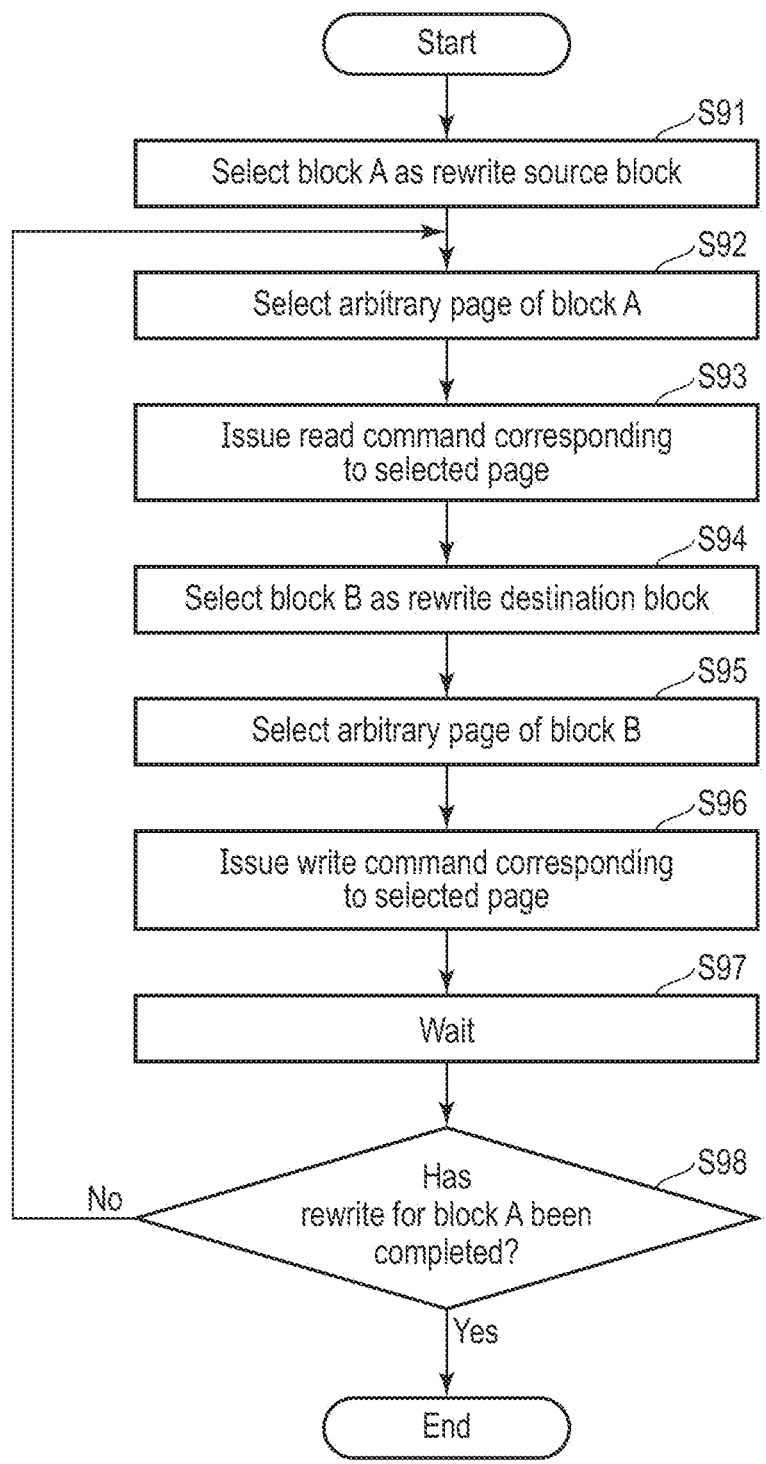
F I G. 23

MEMORY SYSTEM AND CONTROLLING METHOD OF PERFORMING REWRITE OPERATION AT MAXIMUM REWRITE SPEED

CROSS-REFERENCE TO RELATED APPLICATIONS

This application is based upon and claims the benefit of priority from Japanese Patent Application No. 2021-202630, filed Dec. 14, 2021, the entire contents of which are incorporated herein by reference.

FIELD

Embodiments described herein relate generally to a memory system and a controlling method.

BACKGROUND

In recent years, memory systems including nonvolatile memories have been widely used. As one of such memory systems, a solid state drive (an SSD) including a NAND flash memory is known. The NAND flash memory includes a plurality of blocks, each of which is a minimum unit of erasing.

In the memory system such as the SSD, a rewrite operation may be performed to rewrite data stored in a certain block to another block within a certain period of time.

The number of rewrite target blocks that need to be rewritten dynamically increases or decreases depending on an amount of valid data stored in the memory system. When the number of rewrite target blocks decreases, continuously performing the rewrite operation on the same number of blocks at all times increases the number of program/erase cycles of the block to excess. In addition, when the number of rewrite target blocks increases, the rewrite operation cannot be performed in time, and it is necessary to perform the rewrite operation on many blocks in a short period. That is, the rewrite operation may affect I/O performance of the memory system as viewed from a host.

BRIEF DESCRIPTION OF THE DRAWINGS

FIG. 1 is a block diagram illustrating an example of a configuration of an information processing system that includes a memory system according to an embodiment.

FIG. 3 is a block diagram illustrating an example of a configuration of a block group used in the memory system according to the embodiment.

FIG. 10 is a diagram illustrating an example of an operation of excluding a specific block from a target of the rewrite operation performed in the memory system according to the embodiment.

FIG. 20 is a flowchart illustrating a procedure of rewrite speed setting processing when the attribute is set to the block, which is performed in the memory system according to the embodiment.

FIG. 23 is a flowchart illustrating a procedure of processing of setting a waiting time when reading data stored in a page of a rewrite source block and writing data to a page of a rewrite destination block, which is performed in the memory system according to the embodiment.

DETAILED DESCRIPTION

Figure 2:
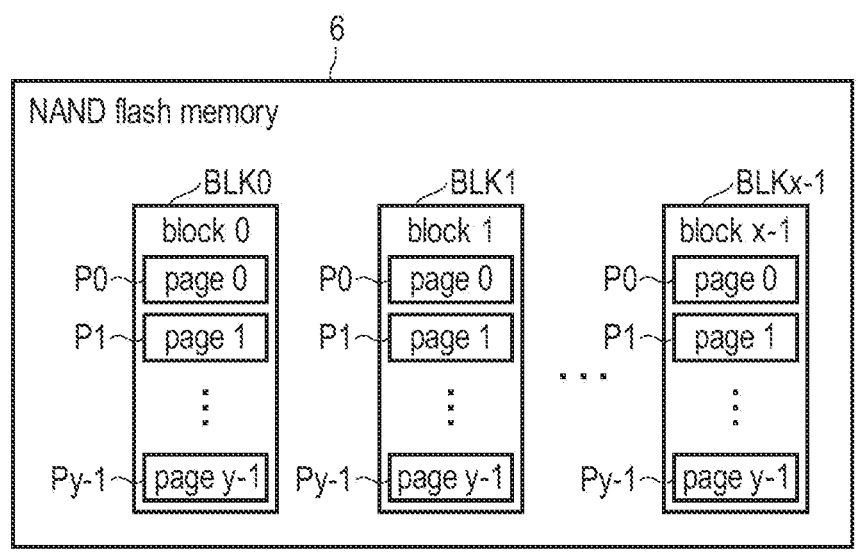
FIG. 2 is a block diagram illustrating an example of a configuration of a NAND flash memory included in the memory system according to the embodiment.

In general, according to one embodiment, a memory system comprises a nonvolatile memory and a controller. The nonvolatile memory includes a plurality of blocks. The controller is configured to perform a rewrite operation of rewriting data stored in each block including valid data to another block among the plurality of blocks. The controller manages a first block set and a second block set respectively corresponding to a first remaining time and a second remaining time that are respectively represented by multiples of a unit time. The first block set is a set of blocks in which a remaining time until a time point at which the rewrite operation is to be performed is the first remaining time. The second block set is a set of blocks in which a remaining time until the time point at which the rewrite operation is to be performed is the second remaining time longer than the first remaining time. The time point at which the rewrite operation is to be performed is a time point after a certain period has elapsed since the data is written to the block. The controller calculates a first rewrite speed based on the first remaining time and a first number of blocks included in the first block set. The controller calculates a second rewrite speed based on the second remaining time and sum of the first number of blocks and a second number of blocks included in the second block set. The controller determines a maximum rewrite speed among the first rewrite speed and the second rewrite speed. The controller performs the rewrite operation on the first number of blocks included in the first block set and the second number of blocks included in the second block set at the determined maximum rewrite speed.

Hereinafter, an embodiment will be described with reference to accompanying drawings.

FIG. 1 is a block diagram illustrating an example of a configuration of an information processing system 1 that includes a memory system 3 according to an embodiment. The memory system 3 according to the embodiment is a storage device that includes a nonvolatile memory.

The information processing system 1 includes a host (host device) 2 and the memory system 3. The host 2 and the memory system 3 can be connected through a bus 4. Communication between the host 2 and the memory system 3 through the bus 4 is performed in accordance with, for example, a standard of NVM Express™ (NVMe™).

The host 2 is an information processing apparatus. The host 2 is, for example, a personal computer or a server computer. The host 2 accesses the memory system 3. Specifically, the host 2 transmits a write command, which is a command for writing data, to the memory system 3. The host 2 transmits a read command, which is a command for reading data, to the memory system 3. In addition, the host 2 transmits an invalidation command, which is a command for invalidating data, to the memory system 3. Examples of the invalidation command include an un-map command and a trim command.

The memory system 3 is a semiconductor storage device. The memory system 3 is, for example, an SSD including a NAND flash memory which is an example of the nonvolatile memory. The memory system 3 writes data to the nonvolatile memory. In addition, the memory system 3 reads data from the nonvolatile memory.

The bus 4 is, for example, a bus that conforms to a standard of PCI Express™ (PCIe™). The bus 4 is mainly used for transmission of data and an I/O command from the host 2 to the memory system 3 and transmission of data and a response from the memory system 3 to the host 2. The I/O command is a command for writing or reading data to or from the nonvolatile memory. Examples of the I/O command include the write command and the read command.

Next, an internal configuration of the host 2 will be described. The host 2 includes a processor 21 and a memory 22.

The processor 21 is a central processing unit (CPU). The processor 21 communicates with the memory system 3 through the bus 4. The processor 21 executes software (host software) loaded into the memory 22. The host software is loaded into the memory 22 from the memory system 3 or another storage device provided in or connected to the host 2. The host software includes an operating system, a file system, a device driver, an application program, and the like.

The memory 22 is a volatile memory. The memory 22 is, for example, a random access memory such as a dynamic random access memory (DRAM).

Next, an internal configuration of the memory system 3 will be described. The memory system 3 includes a controller 5, a NAND flash memory (hereinafter simply referred to as a NAND memory) 6, and a dynamic random access memory (DRAM) 7.

The controller 5 is a memory controller which is an example of a control circuit. The controller 5 is, for example, a semiconductor device such as a system-on-a-chip (SoC). The controller 5 is communicably connected to the NAND memory 6. The controller 5 performs to write data to the NAND memory 6, and read data from the NAND memory 6. In addition, the controller 5 communicates with the host 2 through the bus 4.

The NAND memory 6 is a nonvolatile memory. The NAND memory 6 is, for example, a flash memory having a two-dimensional structure or a flash memory having a three-dimensional structure. The NAND memory 6 includes a plurality of blocks. The block is a minimum unit of erasing data stored in the NAND memory 6.

The DRAM 7 is a volatile memory. The DRAM 7 temporarily stores, for example, write data received from the host 2 or read data read from the NAND memory 6. That is, the DRAM 7 may be used as a write buffer or a read buffer.

Next, an internal configuration of the controller 5 will be described. The controller 5 includes a host interface (host I/F) 51, a CPU 52, a static RAM (SRAM) 53, a direct memory access controller (DMAC) 54, an ECC circuit 55, a counter 56, a DRAM interface (DRAM I/F) 57, and a NAND interface (NAND I/F) 58. These units are connected to an internal bus 50.

The host interface 51 is a hardware interface circuit. The host interface 51 communicates with the host 2. The host interface 51 receives, for example, the I/O command from the host 2.

The CPU 52 is a processor. The CPU 52 controls the host interface 51, the SRAM 53, the DMAC 54, the ECC circuit 55, the counter 56, the DRAM interface 57, and the NAND interface 58. The CPU 52 loads a control program (firmware) from a ROM (not shown) or the NAND memory 6 into the DRAM 7. The CPU 52 performs various processing by executing the control program (firmware). The CPU 52 executes, for example, as a flash translation layer (FTL), management of the data stored in the NAND memory 6 and management of the blocks included in the NAND memory 6. The management of the data stored in the NAND memory

6 is, for example, management of mapping information indicating a correspondence between each of logical addresses and each of physical addresses. The logical address is, for example, a logical block address (LBA). The physical address is an address indicating a physical storage location of the NAND memory 6. The CPU 52 manages mapping between each of the logical addresses and each of the physical addresses by using a logical-to-physical address conversion table (logical-to-physical translation table: L2P table) 71. In addition, the management of the blocks included in the NAND memory 6 is, for example, garbage collection, and a rewrite operation of rewriting data stored in a certain block to another block.

The SRAM 53 is a volatile memory. The SRAM 53 is used, for example, as a write buffer that temporarily stores write data received from the host 2.

The DMAC 54 is a circuit that performs direct memory access (DMA). The DMAC 54 performs data transfer between the memory 22 of the host 2 and each of the DRAM 7 and the SRAM 53.

The ECC circuit 55 is a circuit that encodes data and decodes data. When writing data to the NAND memory 6, the ECC circuit 55 performs encoding of adding an error correction code (ECC) as a redundant code to the data to be written. When reading data from the NAND memory 6, the ECC circuit 55 performs decoding that corrects errors in the read data by using the ECC added to the read data.

The counter 56 is a hardware circuit for measuring time. The counter 56 measures a relative time. The counter 56 can provide the measured time to each unit of the controller 5.

The DRAM interface 57 is a circuit that controls the DRAM 7. The DRAM interface 57 stores data into the DRAM 7 and reads data stored in the DRAM 7.

The NAND interface 58 is a circuit that controls the NAND memory 6. The NAND interface 58 includes NAND controllers 581-0, 581-1, 581-2, . . . , and 581-31. The NAND controllers 581-0, 581-1, 581-2, . . . , and 581-31 are respectively connected to one or more flash dies through channels (ch) 0, 1, 2, . . . , and 31. The flash die is also referred to as a flash chip. The NAND controllers 581-0, 581-1, 581-2, . . . , and 581-31 respectively control, for example, the flash dies #0, #1 , #2, . . . , and #31 included in the NAND memory 6.

Next, information stored in the DRAM 7 will be described. The information stored in the DRAM 7 includes an L2P table 71, an active block list 72, a free block list 73, and a block management table 74.

The L2P table 71 manages the mapping between the logical addresses and the physical addresses, in a predetermined size such as a sector.

The active block list 72 manages the block storing valid data. The valid data is data in which the mapping information is managed in the L2P table 71. That is, the valid data is data that can be designated by the read command received from the host 2. The active block is a block storing at least the valid data. On the other hand, invalid data is data stored in a storage location designated by the physical address from which the mapping with the logical address has been resolved.

The free block list 73 manages the block that does not store the valid data. A free block is a block that does not store the valid data.

The block management table 74 manages the blocks included in the NAND memory 6. The block management table 74 manages, for example, a remaining time until a time point at which the rewrite operation is to be performed for each block.

Next, a configuration example of the NAND memory 6 will be described. FIG. 2 is a block diagram illustrating an example of a configuration of the NAND memory 6 included in the memory system 3 according to the embodiment.

The NAND memory 6 includes a plurality of physical blocks BLK0 to BLKx-1. Each of the physical blocks BLK0 to BLKx-1 is a unit of a data erase operation for the NAND memory 6. The data erase operation is an operation of erasing a part of data stored in the NAND memory 6. Each of the physical blocks BLK0 to BLKx-1 is also referred to as an erase block, a flash block, or a memory block. Each of the physical blocks BLK0 to BLKx-1 includes a plurality of pages P0 to Py-1. Each of the pages P0 to Py-1 is a unit of a data write operation and a data read operation for the NAND memory 6. The data write operation is an operation of writing data. The data read operation is an operation of reading data. Each of the pages P0 to Py-1 includes a plurality of memory cells connected to the same word line.

Next, a block group will be described. FIG. 3 is a block diagram illustrating an example of a configuration of the block group managed in the memory system 3 according to the embodiment.

The management of the blocks in the memory system 3 may be performed in units of a block (physical block) or may be performed in units of a block group including a set of the physical blocks. The block group is also referred to as a super block or a logical block.

The block group, that is, the block group including the set of the physical blocks is not limited to this, but may include a total of 32 physical blocks selected one by one from the flash dies #0 to #31.

Note that each of the flash dies #0 to #31 may have a multi-plane configuration. For example, when each of the flash dies #0 to #31 has the multi-plane configuration including two planes, the block group may include a total of 64 physical blocks selected one by one from 64 planes corresponding to the flash dies #0 to #31.

FIG. 3 illustrates the block group including 32 physical blocks (here, the physical block BLK5 of the flash die #0, the physical block BLK5 of the flash die #1, the physical block BLK6 of the flash die #2, the physical block BLK5 of the flash die #3, the physical block BLK8 of the flash die #4, . . . , and the physical block BLK5 of the flash die #31).

Note that a configuration in which the block group includes only a physical block may be used, and in this case, the block group is equivalent to a physical block. Hereinafter, the block group including the physical blocks is simply referred to as a block.

Figure 4:
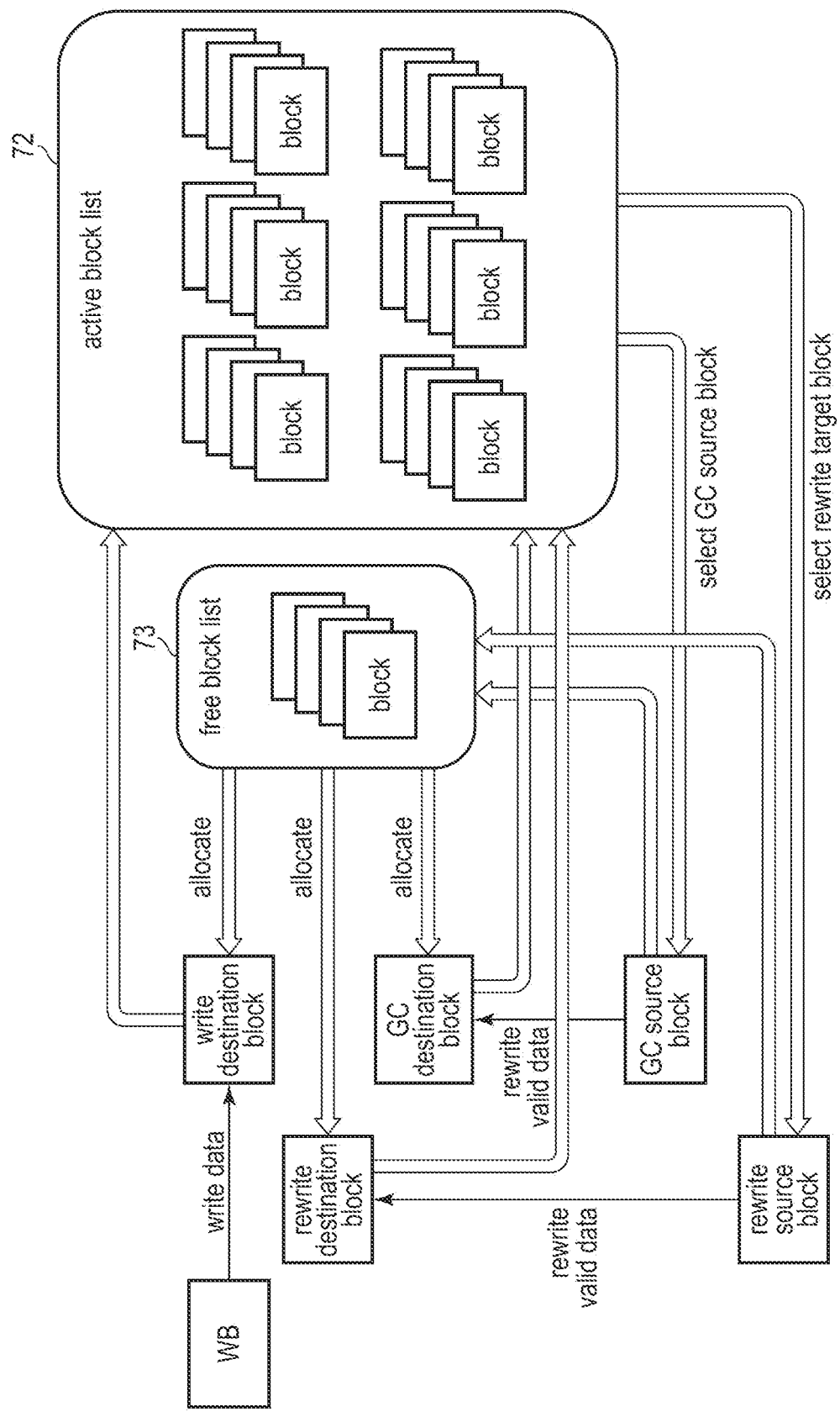
FIG. 4 is a diagram illustrating an example of a data write operation, a garbage collection operation, and a rewrite operation, which are performed in the memory system according to the embodiment.

Next, the data write operation, the garbage collection operation, and the rewrite operation will be described. FIG. 4 is a diagram illustrating an example of the data write operation, the garbage collection operation, and the rewrite operation, which are performed in the memory system 3 according to the embodiment.

The blocks included in the NAND memory 6 are roughly divided into the active block including the valid data and the free block not including the valid data. Each active block is managed by the active block list 72. Each free block is managed by the free block list 73.

The data write operation is an operation of writing write data received from the host 2 to the NAND memory 6. The controller 5 temporarily stores the write data received from the host 2 into the write buffer (for example, a storage area of the DRAM 7). The controller 5 starts the data write operation when the total size of the write data stored in the write buffer reaches a write size.

In the data write operation, the controller 5 selects a free block from the free block list 73. The selected free block is allocated as a write destination block after the erase operation is performed. When there is the write destination block already allocated, an operation of allocating the free block as the write destination block is not necessary.

The controller 5 writes the write data stored in the write buffer (WB) to the write destination block.

When the data is written to the entire write destination block, the controller 5 manages the write destination block by the active block list 72. Then, the controller 5 selects a new free block from the free block list 73 again. The selected free block is allocated as a new write destination block after the erase operation is performed.

The garbage collection operation is an operation of selecting and reading the valid data stored in the active block and rewriting the valid data to another block. In the garbage collection operation, the controller 5 selects the active block having a low ratio of valid data and performs the garbage collection operation. The controller 5 can decrease the number of active blocks and increase the number of free blocks by selecting and reading at least the valid data and writing the data to another block. The controller 5 may start the garbage collection operation when the number of free blocks falls below a threshold.

In the garbage collection operation, the controller 5 selects a free block from the free block list 73. The selected free block is allocated as a garbage collection (GC) destination block after the erase operation is performed. When there is the GC destination block already allocated, the operation of allocating the free block as the GC destination block is not necessary.

The controller 5 selects a garbage collection (GC) source block from the active blocks managed in the active block list 72. For example, the controller 5 may preferentially select the active block having a low ratio of valid data as the GC source block. Alternatively, the controller 5 may select the GC source block using any algorithm.

The controller 5 moves the valid data stored in the selected GC source block from the GC source block to the GC destination block. That is, the controller 5 reads the valid data from the GC source block. Then, the controller 5 writes the valid data read from the GC source block to the GC destination block. Migration of the valid data from the GC source block to the GC destination block may be a copy.

When the migration of all the valid data of the GC source block is completed, the controller 5 manages the GC source block as the free block by the free block list 73. Then, the GC source block that has become the free block is a block that can be reused for writing data.

In addition, when the data is written to the entire GC destination block, the controller 5 manages the GC destination block as the active block by the active block list 72.

The rewrite operation is an operation of reading the data stored in the active block and rewriting the data to another block. For the purpose of data retention, the controller 5 avoids the active block being managed in a state where a certain period has elapsed after the data is written. Therefore, the controller 5 performs the rewrite operation on all the active blocks by the time point at which the rewrite operation is to be performed for each block. The rewrite operation may also be referred to as a refresh operation.

In the rewrite operation, the controller 5 selects a free block from the free block list 73. The selected free block is allocated as a rewrite destination block after the erase operation is performed. When there is the rewrite destination block already allocated, the operation of allocating the free block as the rewrite destination block is not necessary.

The controller 5 selects a rewrite source block from the active blocks managed by the active block list 72. For example, the controller 5 preferentially selects an active block having a short remaining time until a time point at which the rewrite operation is to be started as the rewrite source block.

The controller 5 moves the data stored in the selected rewrite source block from the rewrite source block to the rewrite destination block. That is, the controller 5 reads the data stored in the rewrite source block. Then, the controller 5 writes the data read from the rewrite source block to the rewrite destination block. Here, the controller 5 may select only valid data among the data stored in the rewrite source block and move the selected data to the rewrite destination block, or may move all the data stored in the rewrite source block to the rewrite destination block.

When the migration of the data of the rewrite source block is completed, the controller 5 manages the rewrite source block as the free block by the free block list 73. Then, the rewrite source block that has become the free block is a block that can be reused for writing data.

In addition, when the data is written to the entire rewrite destination block, the controller 5 manages the rewrite destination block as the active block by the active block list 72.

Figure 5:
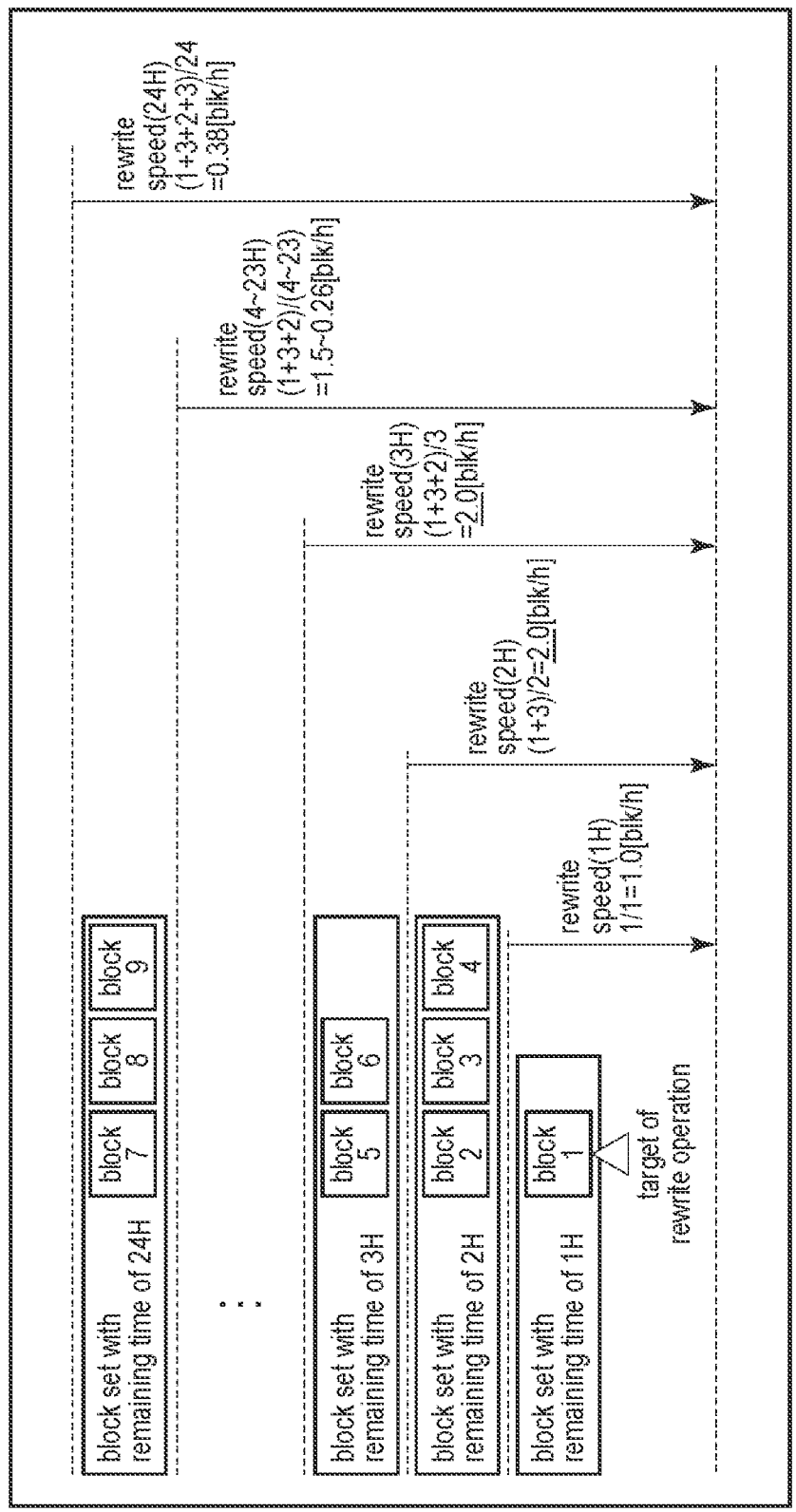
FIG. 5 is a diagram illustrating an example of a plurality of rewrite speeds calculated in the memory system according to the embodiment.

Next, an operation of calculating a rewrite speed will be described. FIG. 5 is a diagram illustrating an example of a plurality of the rewrite speeds calculated in the memory system 3 according to the embodiment. The rewrite speed corresponds to the number of rewrite source blocks processed per unit time by the rewrite operation by the controller 5. The unit time is, for example, one hour. The unit time may be measured by the counter 56. The controller 5 controls the rewrite speed to control the pace of performing the rewrite operation.

The controller 5 manages a plurality of block sets. The controller 5 calculates the rewrite speed using the number of blocks included in each block set. The block sets respectively correspond to any of a plurality of the remaining times that are multiples of the unit time. The remaining time is a remaining time until a time point at which the rewrite operation on the block included in the block set is to be performed. In a case where the rewrite operation is performed within a certain period (for example, 24 hours) for each block, the remaining time of the block immediately after data write is completed is 24 hours. That is, the block set corresponding to a certain remaining time includes a block in which the rewrite operation is to be performed by the time when the remaining time elapses. The controller 5 uses the block management table 74 to manage the remaining time until the time point at which the rewrite operation is to be performed for each active block. The remaining time may be measured by the counter 56.

In FIG. 5, the block set with the remaining time of one hour includes a block 1. The remaining time of the block 1 is one hour.

The block set with the remaining time of two hours includes a block 2, a block 3, and a block 4. The remaining time of each of the block 2, the block 3, and the block 4 is two hours.

The block set with the remaining time of three hours includes a block 5 and a block 6. The remaining time of each of the block 5 and the block 6 is three hours.

The block set with the remaining time of 23 hours from the block set with the remaining time of four hours do not include a block.

The block set with the remaining time of 24 hours includes a block 7, a block 8, and a block 9. The remaining time of each of the block 7, the block 8, and the block 9 is 24 hours.

The controller 5 calculates the rewrite speed by using the remaining time corresponding to each block set and the number of blocks to which the rewrite operation is to be performed by the time when the remaining time elapses. That is, the controller 5 calculates the rewrite speed at which the rewrite operation can be performed on all the blocks in which the rewrite operation is to be performed by the time when the remaining time elapses. Hereinafter, for the sake of simplicity, the rewrite speed at which the rewrite operation can be performed on all the blocks in which the rewrite operation is to be performed by the time when the remaining time elapses is referred to as a rewrite speed corresponding to the remaining time.

The rewrite speed corresponding to the remaining one hour is 1[blk]/1[h]=1.0[blk/h] because the number of blocks included in the block set with the remaining time of one hour is one. The rewrite speed of 1.0[blk/h] is a processing speed at which data of a block can be rewritten per an hour.

The rewrite speed corresponding to the remaining two hours is (1+3)[blk]/2[h]=2.0[blk/h], because the number of blocks included in the block set with the remaining time of one hour is one and the number of blocks included in the block set with the remaining time of two hours is three. The rewrite speed of 2.0[blk/h] is a processing speed at which data of two blocks can be rewritten per an hour.

The rewrite speed corresponding to the remaining three hours is (1+3+2)[blk]/3[h]=2.0[blk/h], because the number of blocks included in the block set with the remaining time of one hour is one, the number of blocks included in the block set with the remaining time of two hours is three, and the number of blocks included in the block set with the remaining time of three hours is two.

The rewrite speeds corresponding to the remaining four to 23 hours are (1+3+2)[blk]/4[h]=1.5[blk/h] to (1+3+2)[blk]/23[h]=0.26[blk/h], because the number of blocks included in the block set with the remaining time of one hour is one, the number of blocks included in the block set with the remaining time of two hours is three, the number of blocks included in the block set with the remaining time of three hours is two, and the number of blocks included in the block set with the remaining time of four hours to the block set with the remaining time of 23 hours is zero. The rewrite speed of 1.5[blk/h] is a processing speed at which data of 1.5 blocks can be rewritten per an hour. The rewrite speed of 0.26[blk/h] is a processing speed at which data of 0.26 blocks can be rewritten per an hour.

The rewrite speed corresponding to the remaining 24 hours is (1+3+2+3)[blk]/24[h]=0.38[blk/h], because the number of blocks included in the block set with the remaining time of one hour is one, the number of blocks included in the block set with the remaining time of two hours is three, the number of blocks included in the block set with the remaining time of three hours is two, and the number of blocks included in the block set with the remaining time of 24 hours is three. The rewrite speed of 0.38[blk/h] is a processing speed at which data of 0.38 blocks can be rewritten per an hour.

The controller 5 determines a maximum rewrite speed from among the calculated rewrite speeds. The controller 5 performs the rewrite operation at the determined maximum rewrite speed. Here, the controller 5 performs the rewrite operation at a speed (2.0[blk/h]) at which two blocks are processed as the rewrite source blocks per an hour.

Figure 6:
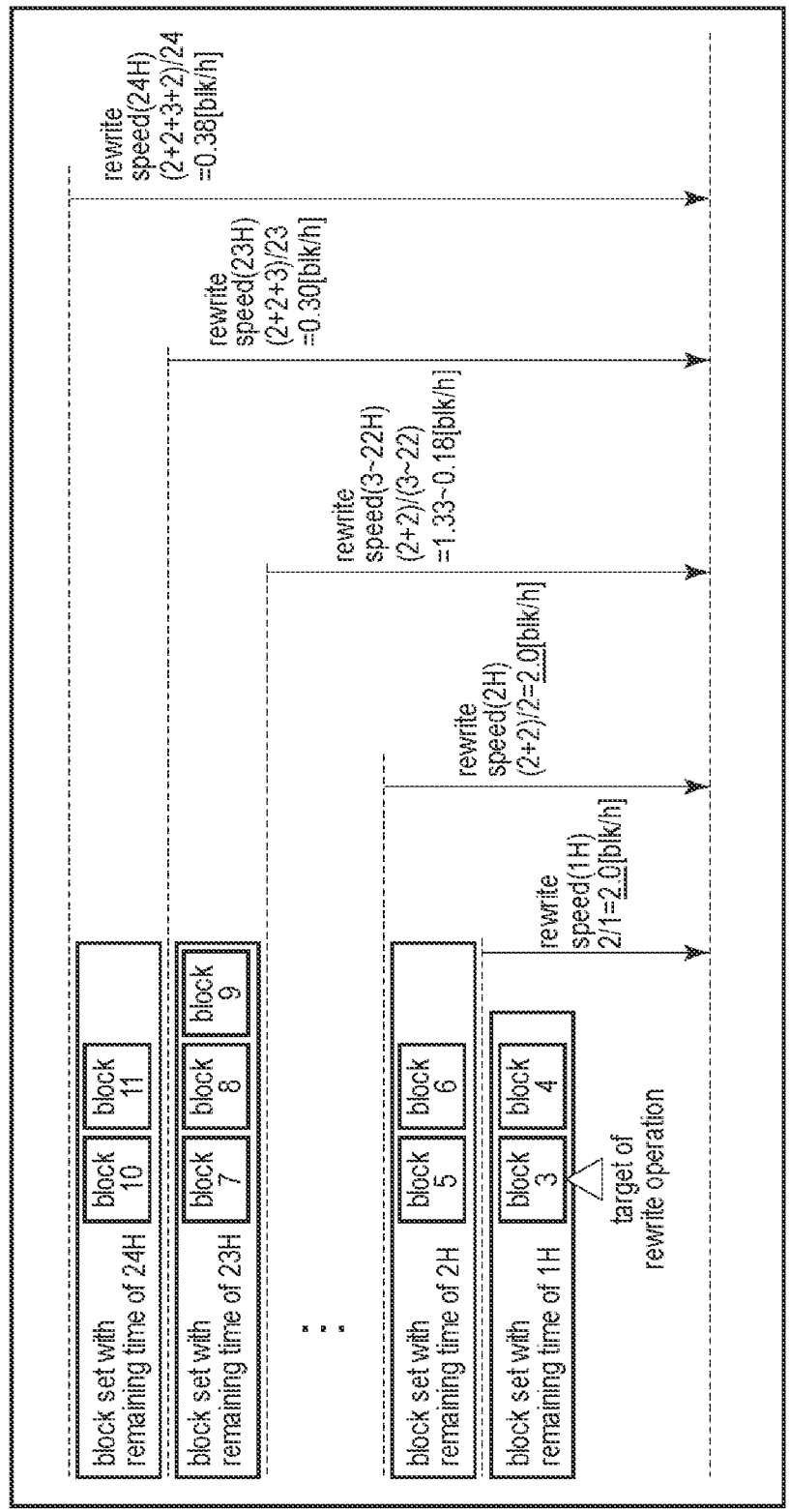
FIG. 6 is a diagram illustrating another example of the rewrite speeds calculated in the memory system according to the embodiment.

Next, the operation of calculating the rewrite speed after the unit time (that is, one hour) has elapsed from a state of FIG. 5 will be described. FIG. 6 is a diagram illustrating another example of the rewrite speeds calculated in the memory system 3 according to the embodiment.

In response to elapse of the unit time, the controller 5 updates registration of the block for each block set. That is, each block included in each block set is registered to a block set corresponding to a remaining time shorter by the unit time. For example, the controller 5 registers the block 3 and the block 4 included in the block set with the remaining time of two hours to the block set with the remaining time of one hour.

In FIG. 6, the block 1 and the block 2 are selected as a target of the rewrite operation of the speed of 2.0[blk/h], and thus are removed from the block set with the remaining time of one hour to be managed as free blocks.

The block set with the remaining time of one hour includes the block 3 and the block 4. The block set with the remaining time of two hours includes the block 5 and the block 6. The block set with the remaining time of 23 hours includes the block 7, the block 8, and the block 9.

The block set with the remaining time of 24 hours includes a block 10 and a block 11. The block 10 and the block 11 are blocks in which the data has been newly written, that is, blocks which have become new active blocks.

Then, the controller 5 performs calculation of the rewrite speed again in response to the elapse of the unit time.

The rewrite speed corresponding to the remaining one hour is 2[blk]/1[h]=2.0[blk/h] because the number of blocks included in the block set with the remaining time of one hour is two.

The rewrite speed corresponding to the remaining two hours is (2+2)[blk]/2[h]=2.0[blk/h], because the number of blocks included in the block set with the remaining time of one hour is two and the number of blocks included in the block set with the remaining time of two hours is two.

The rewrite speeds corresponding to the remaining three to 22 hours are (2+2)[blk]/3[h]=1.33[blk/h] to (2+2)[blk]/22[h]=0.18[blk/h], because the number of blocks included in the block set with the remaining time of one hour is two and the number of blocks included in the block set with the remaining time of two hours is two.

The rewrite speed corresponding to the remaining 23 hours is (2+2+3)[blk]/23[h]=0.30[blk/h], because the number of blocks included in the block set with the remaining time of one hour is two, the number of blocks included in the block set with the remaining time of two hours is two, and the number of blocks included in the block set with the remaining time of 23 hours is three.

The rewrite speed corresponding to the remaining 24 hours is (2+2+3+2)[blk]/4[h]=0.38[blk/h], because the number of blocks included in the block set with the remaining time of one hour is two, the number of blocks included in the block set with the remaining time of two hours is two, the number of blocks included in the block set with the remaining time of 23 hours is three, and the number of blocks included in the block set with the remaining time of 24 hours is two.

The controller 5 determines a maximum rewrite speed from among the calculated rewrite speeds. The controller 5 performs the rewrite operation at the determined maximum rewrite speed. Here, the controller 5 performs the rewrite operation at a speed (2.0[blk/h]) at which two blocks are processed as the rewrite source blocks per an hour.

Figure 7:
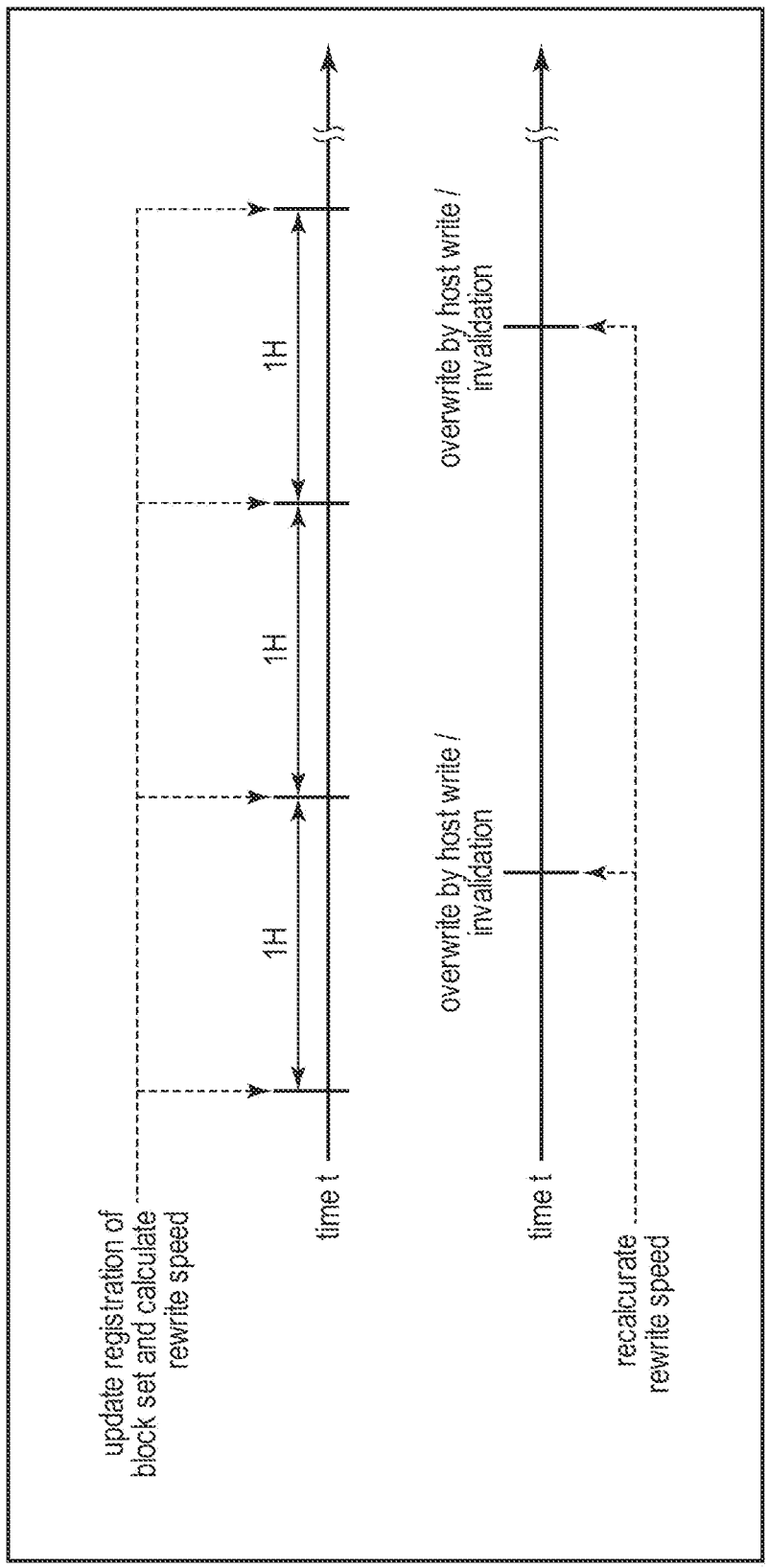
FIG. 7 is a diagram illustrating an example of timing at which the rewrite speeds are calculated in the memory system according to the embodiment.

Next, a timing at which the operation of calculating the rewrite speed is performed will be described. FIG. 7 is a diagram illustrating an example of timing at which the rewrite speeds are calculated in the memory system 3 according to the embodiment.

As described with reference to FIGS. 5 and 6, the controller 5 updates the registration of the block included in the block set and calculates the rewrite speed, each time the unit time (one hour) elapses. That is, the controller 5 performs the rewrite operation for the unit time at the maximum rewrite speed determined in the calculation of the rewrite speed.

In addition, the controller 5 recalculates the rewrite speed in response to the fact that any active block becomes the free block by overwrite by the write command received from the host 2, the invalidation command received from the host 2, or a format command. The format command is a command for formatting the NAND memory 6.

For example, when the write command for designating an already-written logical address is received and the received write data is written to a new storage location, the controller 5 updates the L2P table 71 so as to manage the mapping between the logical address and the physical address indicating the new storage location. Thus, the data stored in the original physical address becomes invalid data. Further, when the invalidation command for designating a certain logical address is received, the controller 5 updates the L2P table 71 so as to discard the mapping between the logical address and the physical address. Thus, the data stored in this physical address becomes invalid data.

Therefore, when the valid data becomes the invalid data by the overwrite by the write command received from the host 2, or by the invalidation command, any of the active blocks can be the free block not including the valid data. Alternatively, the active block in which a ratio of stored valid data is reduced is selected as a target of the garbage collection operation, so that the active block can be the free block. When the active block becomes the free block, the number of blocks included in each block set changes (decrease in this case). Therefore, the controller 5 performs the calculation of the rewrite speed again, so that the rewrite speed having a smaller value can be determined as the maximum rewrite speed. Thus, the controller 5 can adaptively adjust the rewrite speed, and can prevent the number of program/erase cycles of each block from unnecessarily increasing.

Next, a case where a threshold of the remaining time until the rewrite operation is performed is set will be described. For example, when there is only a block immediately after the data write is completed, the rewrite operation may be performed for the block included in the block set with the remaining time of 24 hours. In this case, the data is read from the block included in the block set with the remaining time of 24 hours, and the read data is written to the rewrite destination block. Then, the rewrite destination block is registered to the block set with the remaining time of 24 hours. The fact that such useless read and write are performed unnecessarily increase the number of program/erase cycles of a write target block. In order to avoid useless read and write from being performed, the controller 5 may set a threshold for limiting a rewrite target block. Thus, the life of the NAND memory 6 can be extended.

Figure 8:
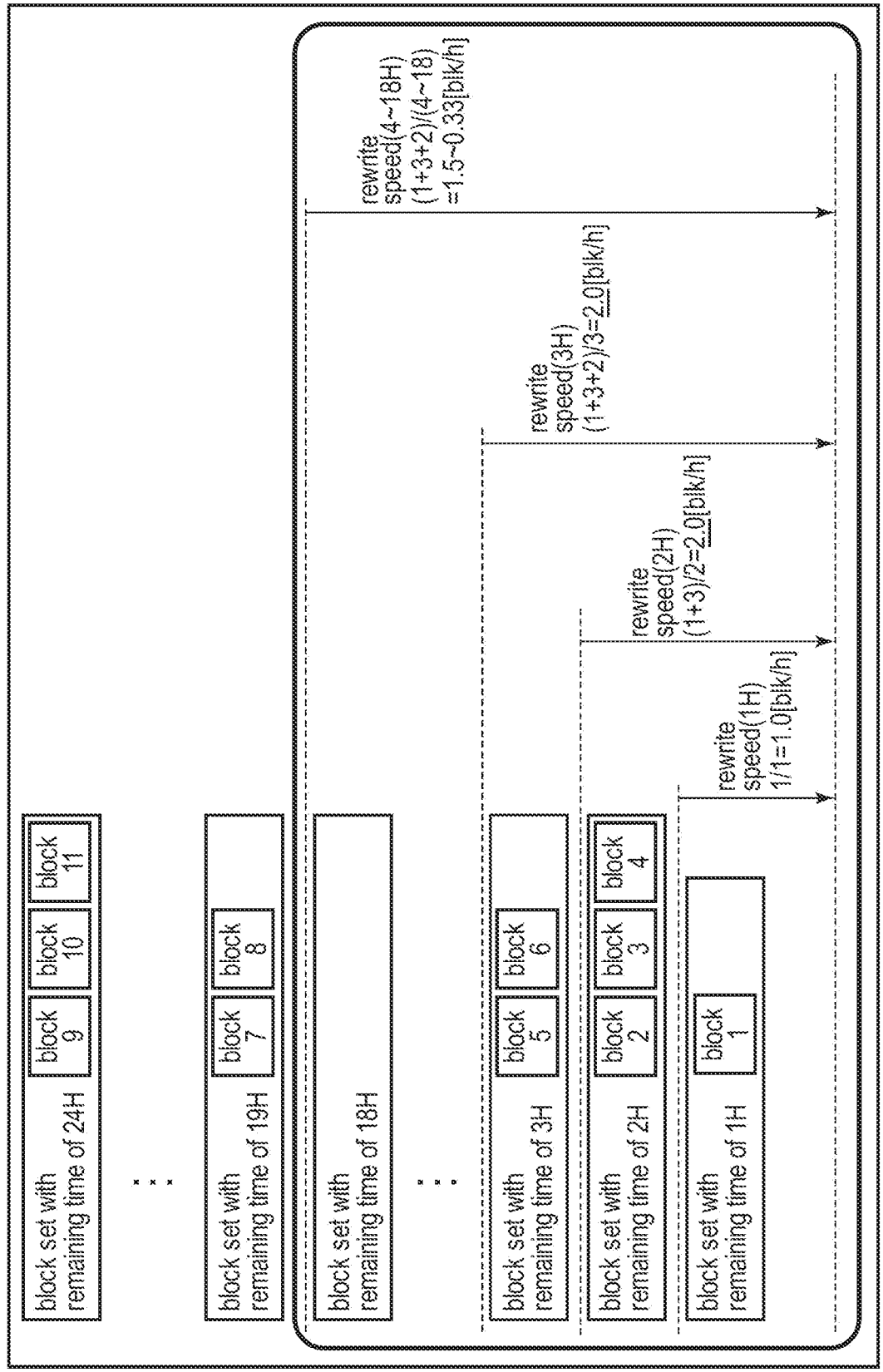
FIG. 8 is a diagram illustrating an example of the rewrite speeds when a threshold is set in the memory system according to the embodiment.

FIG. 8 is a diagram illustrating an example of the rewrite speeds when the threshold is set in the memory system 3 according to the embodiment. Here, the controller 5 sets the threshold to 18 hours.

The block set with the remaining time of one hour includes the block 1. The block set with the remaining time of two hours includes the block 2, the block 3, and the block 4. The block set with the remaining time of three hours includes the block 5 and the block 6. The block set with the remaining time of 19 hours includes the block 7 and the block 8. The block set with the remaining time of 24 hours includes the block 9, the block 10, and the block 11.

Then, in response to the elapse of the unit time or a change in the number of blocks included in each block set due to the overwrite or invalidation by the host 2, the controller 5 calculates the rewrite speed for the block corresponding to the remaining time less than or equal to the threshold.

The rewrite speed corresponding to the remaining one hour is 1[blk]/1[h]=1.0[blk/h] because the number of blocks included in the block set with the remaining time of one hour is one.

The rewrite speed corresponding to the remaining two hours is (1+3)[blk]/2[h]=2.0[blk/h], because the number of blocks included in the block set with the remaining time of one hour is one and the number of blocks included in the block set with the remaining time of two hours is three.

The rewrite speed corresponding to the remaining three hours is (1+3+2)[blk]/3[h]=2.0[blk/h], because the number of blocks included in the block set with the remaining time of one hour is one, the number of blocks included in the block set with the remaining time of two hours is three, and the number of blocks included in the block set with the remaining time of three hours is two.

The rewrite speeds corresponding to the remaining four to 18 hours are (1+3+2)[blk]/4[h]=1.5[blk/h] to (1+3+2)[blk]/18[h]=0.33[blk/h], because the number of blocks included in the block set with the remaining time of one hour is one, the number of blocks included in the block set with the remaining time of two hours is three, the number of blocks included in the block set with the remaining time of three hours is two, and the number of blocks included in the block set with the remaining time of four hours to the block set with the remaining time of 17 hours is zero.

The blocks included in the block set corresponding to the remaining time longer than the threshold are excluded from the target of the rewrite operation. Therefore, the excluded block is not selected as the rewrite source block and is not calculated when the rewrite speed is calculated.

Therefore, since the rewrite speed corresponding to the remaining time longer than the threshold is less than the rewrite speed calculated for the remaining time less than or equal to the threshold, the controller 5 may skip the operation of calculating the rewrite speed corresponding to the remaining time longer than the threshold.

The controller 5 determines the maximum rewrite speed from among the calculated rewrite speeds. The controller 5 performs the rewrite operation at the determined maximum rewrite speed. Here, the controller 5 performs the rewrite operation at a speed (2.0[blk/h]) at which two blocks are processed as the rewrite source blocks per an hour.

Figure 9:
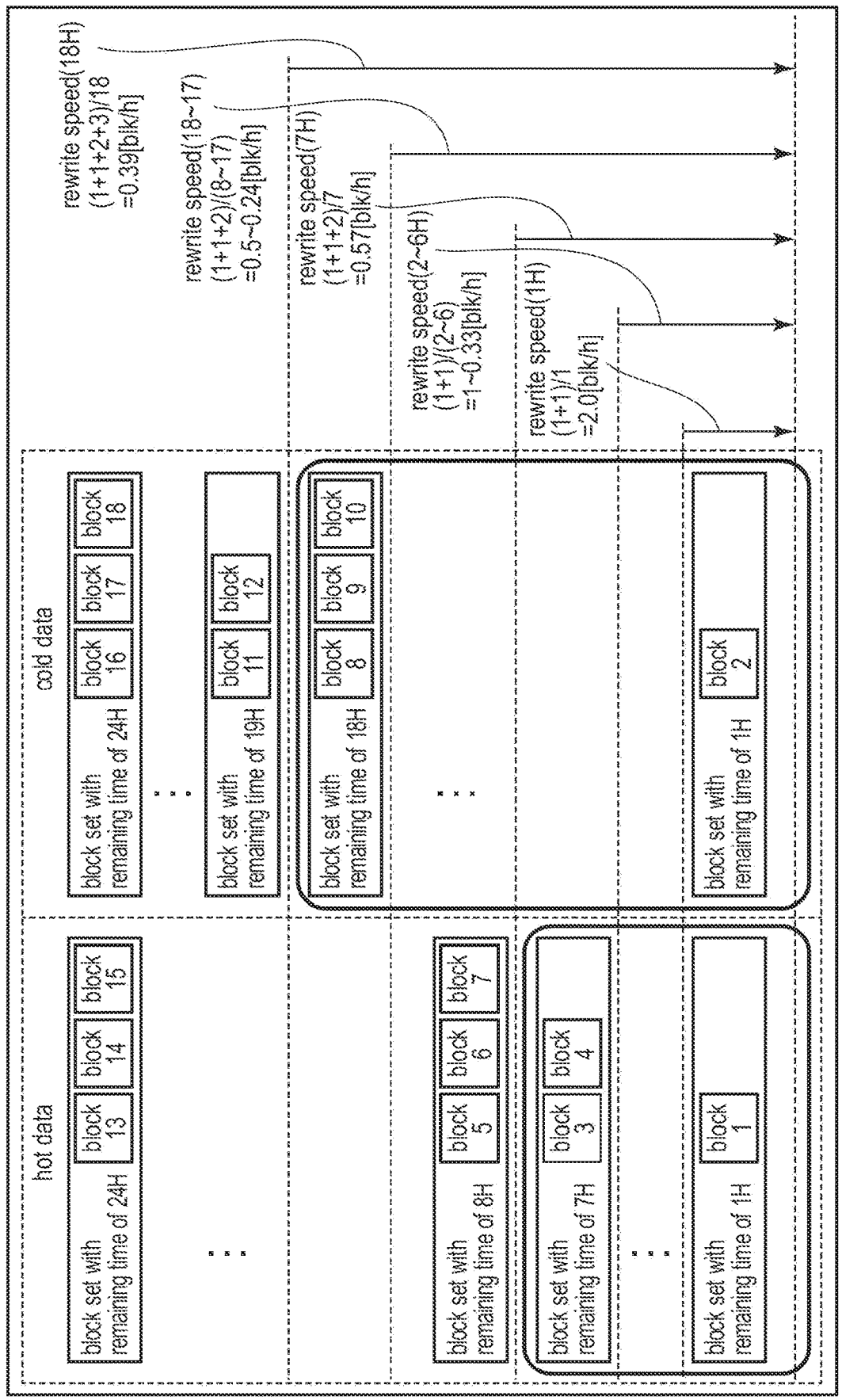
FIG. 9 is a diagram illustrating an example of the rewrite speeds when different thresholds are set for a block storing hot data and a block storing cold data, in the memory system according to the embodiment.

Next, a case where the blocks included in each block set are divided based on two types of data types, and the threshold value is set for each of the blocks will be described. FIG. 9 is a diagram illustrating an example of the rewrite speeds when different thresholds are set for a block storing hot data and a block storing cold data, in the memory system 3 according to the embodiment.

The hot data is data that is more likely to be updated by overwriting with the write command received from the host 2. The hot data can also be said to be data having a relatively higher update frequency than the cold data. For example, the data contained in the block in which the data corresponding to the write command received from the host 2 has been written is likely to be the hot data. Therefore, the block in which the data corresponding to the write command received from the host 2 has been written can be treated as the block storing the hot data.

The cold data is data that is less likely to be updated by, for example, overwriting with the write command received from the host 2 as compared with the hot data. The cold data can also be said to be data having a relatively lower update frequency than the hot data. For example, the data contained in the block (GC destination block, rewrite destination block) in which the data has been written by the garbage collection operation or the rewrite operation indicates that rewrite has not been performed for a long time, and thus the data is more likely to be the cold data. Therefore, the block in which the data has been written by the garbage collection operation or the rewrite operation can be treated as the block storing the cold data.

At this time, since the block storing the hot data is more likely to be the free block, the controller 5 delays a timing at which the block storing the hot data is selected as the target of the rewrite operation, so that the useless rewrite operation can be avoided from being performed. Therefore, the controller 5 sets a threshold lower than that of the block storing the cold data for the block storing the hot data.

On the other hand, since the block storing the cold data is less likely to be the free block, the controller 5 can stabilize the rewrite speed for a long period by taking the calculation of the rewrite speed into consideration from an early timing. That is, the controller 5 can prevent the rewrite speed from rapidly increasing or decreasing. Therefore, the controller 5 sets a threshold higher than that of the block storing the hot data for the block storing the cold data.

Accordingly, the controller 5 sets a first threshold corresponding to the block storing the hot data and a second threshold corresponding to the block storing the cold data. In FIG. 9, the first threshold corresponding to the block storing the hot data is seven hours, and the second threshold corresponding to the block storing the cold data is 18 hours.

The block set with the remaining time of one hour includes the block 1 storing the hot data and the block 2 storing the cold data. The block set with the remaining time of seven hours includes the block 3 and the block 4 storing the hot data and does not include the block storing the cold data. The block set with the remaining time of eight hours includes the block 5, the block 6, and the block 7 storing the hot data and does not include the block storing the cold data. The block set with the remaining time of 18 hours includes the block 8, the block 9, and the block 10 storing the cold data and does not include the block storing the hot data. The block set with the remaining time of 19 hours includes the block 11 and the block 12 storing the cold data and does not include the block storing the hot data. The block set with the remaining time of 24 hours includes the block 13, the block 14, and the block 15 storing the hot data, and the block 16, the block 17, and the block 18 storing the cold data.

Then, the controller 5 calculates the rewrite speed in response to the elapse of the unit time or the change in the number of blocks included in each block set.

The rewrite speed corresponding to the remaining one hour is $(1+1)[\text{blk}]/1[\text{h}]=2.0[\text{blk/h}]$, because the number of blocks storing the hot data contained in the block set with the remaining time of one hour is one and the number of blocks storing the cold data contained in the block set with the remaining time of one hour is one.

The rewrite speeds corresponding to the remaining two to six hours are $(1+1)[\text{blk}]/2[\text{h}]=1.0[\text{blk/h}]$ to $(1+1)[\text{blk}]/6[\text{h}]=0.33[\text{blk/h}]$, because the number of blocks storing the hot data contained in the block set with the remaining time of one hour is one and the number of blocks storing the cold data contained in the block set with the remaining time of one hour is one.

The rewrite speed corresponding to the remaining seven hours is $(1+1+2)[\text{blk}]/7[\text{h}]=0.57[\text{blk/h}]$, because the number of blocks storing the hot data contained in the block set with the remaining time of one hour is one, the number of blocks storing the cold data contained in the block set with the remaining time of one hour is one, and the number of blocks storing the hot data contained in the block set with the remaining time of seven hours is two.

The rewrite speeds corresponding to the remaining eight to 17 hours are $(1+1+2)[\text{blk}]/8[\text{h}]=0.5[\text{blk/h}]$ to $(1+1+2)[\text{blk}]/17[\text{h}]=0.24[\text{blk/h}]$, because the number of blocks storing the hot data contained in the block set with the remaining time of one hour is one, the number of blocks storing the cold data contained in the block set with the remaining time of one hour is one, and the number of blocks storing the hot data contained in the block set with the remaining time of seven hours is two. Here, since the first threshold is set to seven hours, the controller 5 does not consider the block 5, the block 6, and the block 7 that store the hot data contained in the block set with the remaining time of eight hours.

The rewrite speed corresponding to the remaining 18 hours are $(1+1+2+3)[\text{blk}]/18[\text{h}]=0.39[\text{blk/h}]$, because the number of blocks storing the hot data contained in the block set with the remaining time of one hour is one, the number of blocks storing the cold data contained in the block set with the remaining time of one hour is one, the number of blocks storing the hot data contained in the block set with the remaining time of seven hours is two, and the number of blocks storing the cold data contained in the block set with the remaining time of 18 hours is three.

Since the remaining time of 19 hours or more exceeds both the first threshold and the second threshold, the controller 5 may skip the calculation of the rewrite speeds corresponding to the remaining 19 hours to the remaining 24 hours.

The controller 5 determines the maximum rewrite speed from among the calculated rewrite speeds. The controller 5 performs the rewrite operation at the determined maximum rewrite speed. Here, the controller 5 performs the rewrite operation at a speed $(2.0[\text{blk/h}])$ at which two blocks are processed as the rewrite source blocks per an hour.

Next, a case where a specific block is excluded from the target of the rewrite operation will be described. FIG. 10 is a diagram illustrating an example of an operation of excluding a specific block from the target of the rewrite operation performed in the memory system 3 according to the embodiment. Here, the controller 5 sets the threshold to 18 hours.

The controller 5 performs processing of preventing only a specific block from being selected as the target of the rewrite operation at a high frequency. This is to prevent the number of program/erase cycles of a specific block from increasing more than those of other blocks.

The controller 5 records the remaining time of the block selected as the target of the rewrite operation. Then, when the data is written to the block again after the block becomes the free block by the rewrite operation, the controller 5 excludes the block from the target of the rewrite operation until the recorded remaining time elapses. Thus, the controller 5 can set the total time during which the block is managed as the active block in two rewrite operations to a cycle of the rewrite operation (24 hours) at the minimum.

As a specific example, as illustrated in (a) of FIG. 10, it is assumed that the block 1 included in the block set with the remaining time of 18 hours is selected as the target (that is, the rewrite source block) of the rewrite operation. At this time, the controller 5 records 18 hours, which is the remaining time of the block 1. Then, when the rewrite operation is completed, the controller 5 registers the block 1 to the free block list 73.

Thereafter, when new data is written to the block 1, the controller 5 manages the block 1 again as the active block. At this time, the controller 5 excludes the block 1 from the target of the rewrite operation until 18 hours elapse after the block 1 is managed as the active block. That is, until the block 1 is included in the block set with the remaining time of six hours, the controller 5 excludes the block 1 from the target of the rewrite operation. Therefore, as illustrated in (b) of FIG. 10, even if the block 1 is included in the block set with the remaining time of 18 hours corresponding to the threshold (18 hours), the controller 5 does not count the block 1 and does not select the block 1 as the target block of the rewrite operation, when calculating the rewrite speed. (b) of FIG. 10 illustrates a state in which the block 1 included in the block set with the remaining time of 18 hours is excluded from the target of the rewrite operation.

When 12 hours elapse after the block 1 is included in the block set with the remaining time of 18 hours, the controller 5 adds the block 1 to the target of the rewrite operation as illustrated in (c) of FIG. 10. The controller 5 can count the block 1 included in the block set with the remaining time of six hours at the time of calculating the rewrite speed and select the block 1 as the target of the rewrite operation. With such an operation, it is possible to prevent only the number of program/erase cycles of the block 1 from increasing more than the numbers of program/erase cycles of the other blocks.

Figures 11, 12:
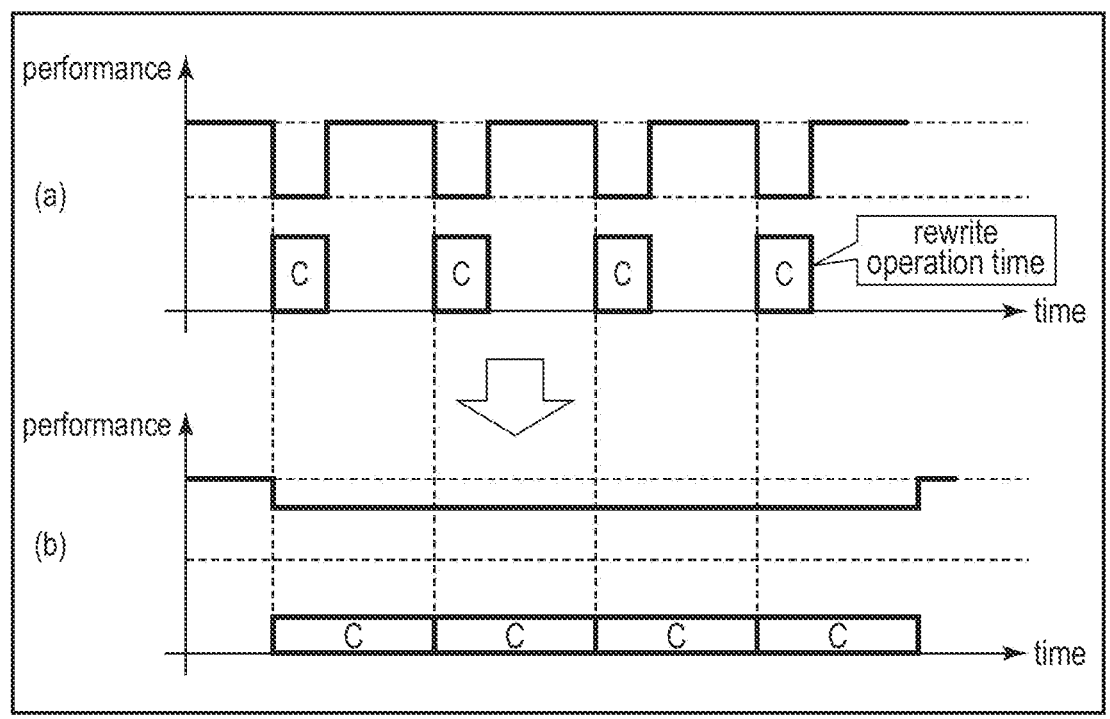
FIG. 11 is a diagram illustrating an example of a configuration of a block management table managed in the memory system according to the embodiment.
FIG. 12 is a diagram illustrating an example of a relationship between a speed of the rewrite operation performed in the memory system according to the embodiment and performance of the memory system.

Next, a configuration of the block management table 74 will be described. FIG. 11 is a diagram illustrating an example of a configuration of the block management table 74 managed in the memory system 3 according to the embodiment.

The block management table 74 manages, for example, a block identifier (ID), a remaining time, an attribute, and an exclusion time.

The block ID is an identifier for identifying each block included in the NAND memory 6.

The remaining time is a time until the time point at which the rewrite operation is to be performed. The remaining time may be information indicating in which block set the block is included.

The attribute is information indicating whether the data stored in the block is the hot data or the cold data.

The exclusion time is information indicating a remaining time until the block can be selected as the target of the rewrite operation. The exclusion time may be determined based on the threshold, the attribute, and the remaining time when the rewrite operation has been previously performed.

The block 1 is a block immediately after the data is written and having the remaining time of 24 hours. The block 1 is a block storing the cold data in which the data has been written by the rewrite operation.

With reference to the threshold corresponding to the block storing the cold data, the controller 5 sets the exclusion time of the block 1 to, for example, 18 hours.

The block 2 has the remaining time of 14 hours. The block 2 is a block storing the hot data in which the data has been written by the write command received from the host 2. With reference to the threshold corresponding to the block storing the hot data, the controller 5 sets the exclusion time of the block 2 to, for example, seven hours.

The block 3 has the remaining time of nine hours. The block 3 is a block storing the cold data in which the data has been written by the rewrite operation. The controller 5 sets the exclusion time of the block 3 to six hours with reference to the threshold corresponding to the block storing the cold data and the remaining time (for example, 18 hours) when the rewrite operation has been performed last time in the block 3.

The block 4 has the remaining time of five hours. The block 4 is a block storing the hot data in which the data has been written by the write command received from the host 2. With reference to the threshold corresponding to the block storing the hot data, the controller 5 sets the exclusion time of the block 4 to, for example, seven hours.

Next, an effect of performing the rewrite operation on performance of the memory system 3 will be described. FIG. 12 is a diagram illustrating an example of a relationship between a speed of the rewrite operation performed in the memory system 3 according to the embodiment and the performance of the memory system.

In the rewrite operation, the controller 5 reads the data from the rewrite source block included in the NAND memory 6, and writes the read data to the rewrite destination block included in the NAND memory 6. Therefore, a bandwidth of a transmission channel between the controller 5 and the NAND memory 6 is consumed by the rewrite operation which is an internal operation of the memory system 3. Therefore, as illustrated in (a) of FIG. 12, the performance of the memory system 3 viewed from the host 2 is reduced by performing the rewrite operation.

In particular, as illustrated in (a) of FIG. 12, when the rewrite operation is intensively performed in a short period, the performance of the memory system 3 during the period is greatly reduced.

Therefore, as illustrated in (b) of FIG. 12, the controller 5 slowly performs the rewrite operation on each block while maintaining the pace. Thus, the controller 5 prevents the performance of the memory system 3 from being rapidly reduced.

Figure 13:
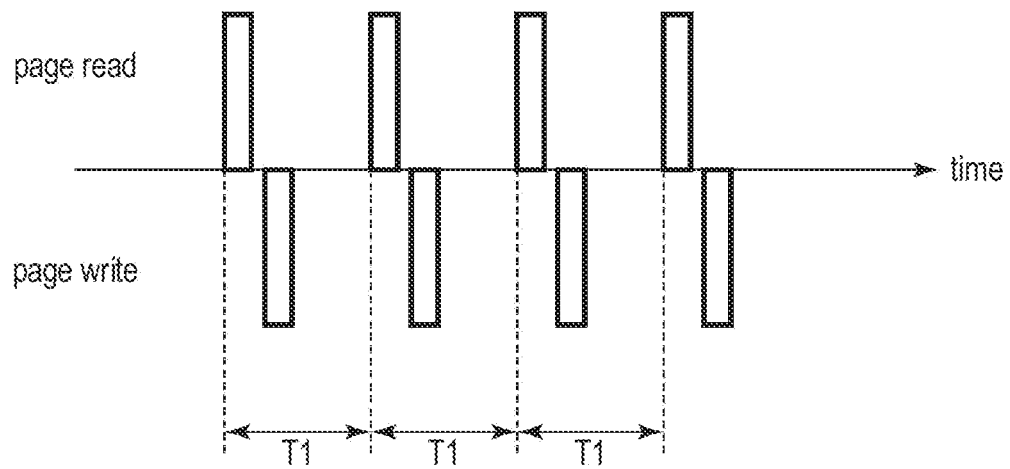
FIG. 13 is a diagram illustrating an example of timing of each of a page read operation and a page write operation performed in the memory system according to the embodiment.

The controller 5 sets a waiting time, when reading the data stored in a page of the rewrite source block and writing the data to a page of the rewrite destination block. FIG. 13 is a diagram illustrating an example of timing of each of a page read operation and a page write operation performed in the memory system 3 according to the embodiment.

The controller 5 issues a page read designating an arbitrary page of the rewrite source block and a page write to an arbitrary page of the rewrite destination block. Here, the controller 5 sets a waiting time T1 from issuance of the page read designating a first page of the rewrite source block to issuance of the page read designating a second page of the rewrite source block.

In other words, the controller 5 sets the waiting time T1 each time performing processing on a page including the page read operation of reading data from the rewrite source block and the page write operation of writing data read by the page read operation to the rewrite destination block. Thus, the controller 5 can control the time until the rewrite operation of rewriting the data stored in the rewrite source block to the rewrite destination block is completed.

Figure 14:
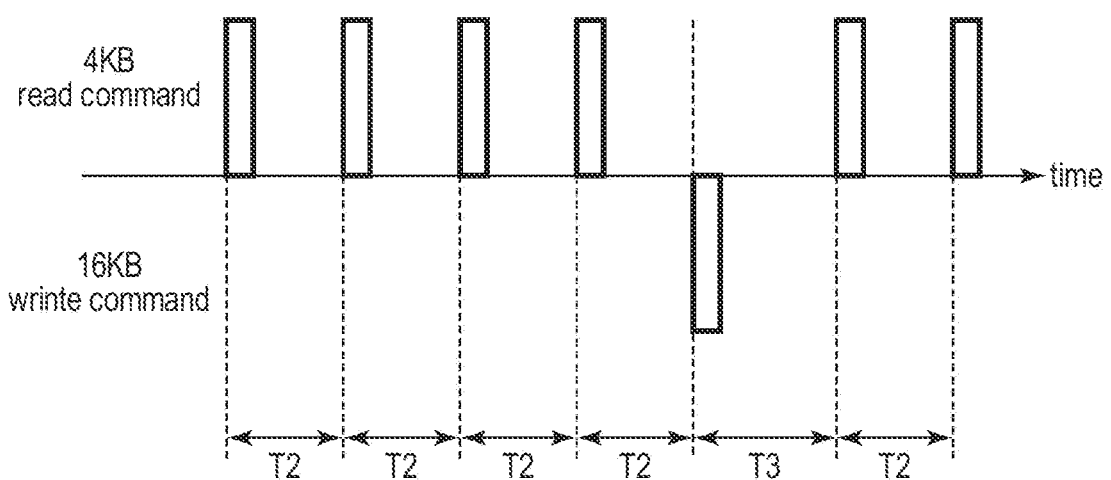
FIG. 14 is a diagram illustrating an example of a waiting time set when a read command and a write command are issued to a nonvolatile memory, in the memory system according to the embodiment.

In addition, the controller 5 sets the waiting time, when the read command and the write command are issued to the NAND memory 6. FIG. 14 is a diagram illustrating an example of the waiting time set when the read command and the write command are issued to the NAND memory 6, in the memory system 3 according to the embodiment. Here, an example in which a page has a size of 16 KB will be described.

For example, the controller 5 obtains data for a page (16 KB) from the rewrite source block by transmitting the read command for reading the data in units of 4 KB from the rewrite source block to the NAND memory 6 four times. In this case, the controller 5 sets a waiting time T2 each time the read command is transmitted to the NAND memory 6. After the waiting time T2 elapses after the read command is transmitted to the NAND memory 6, the controller 5 transmits the next read command to the NAND memory 6. In this manner, the controller 5 sequentially transmits the read command for reading the data in units of 4 KB to the NAND memory 6 at a time interval of the waiting time T2. When the controller 5 obtains the data for a page (16 KB) from the rewrite source block, the controller 5 transmits the write command (program command) for writing data of 16 KB to another block (the rewrite destination block) to the NAND memory 6, for example, when the waiting time T2 elapses since transmission of a fourth read command.

In this case, the controller 5 sets a waiting time T3 each time the write command (program command) is transmitted to the NAND memory 6. When the waiting time T3 elapses since transmission of the write command, the controller 5 sequentially transmits the read command for reading the data in units of 4 KB to the NAND memory 6 again at the time interval of the waiting time T2.

The controller 5 can control the time until the rewrite operation on the rewrite source block is completed by controlling the waiting time T2 and the waiting time T3.

Figure 15:
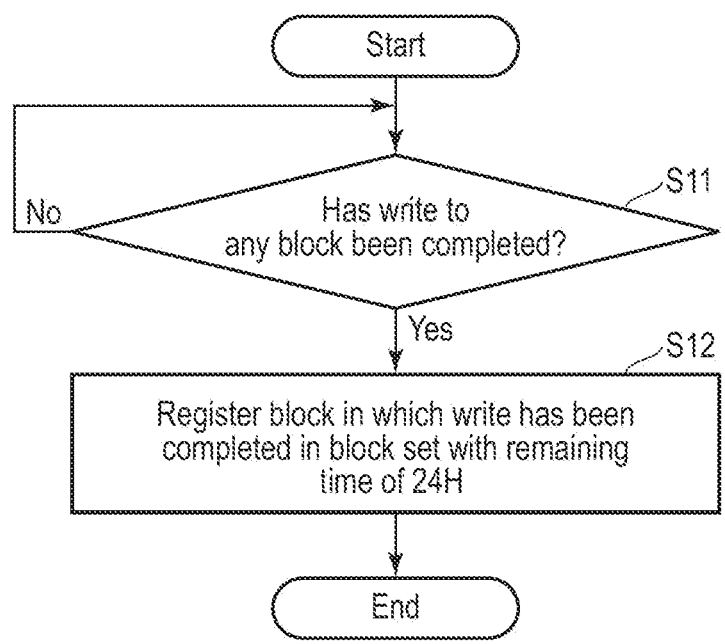
FIG. 15 is a flowchart illustrating a procedure of processing of registering a block to a block set, which is performed in the memory system according to the embodiment.

Next, a procedure for registering the block to the block set will be described. FIG. 15 is a flowchart illustrating a procedure of processing of registering the block to the block set, which is performed in the memory system 3 according to the embodiment.

The controller 5 determines whether write to any block has been completed (S11).

When the write to any block is not completed (No in S11), the controller 5 waits until the write to any block is completed.

When the write to one of the blocks is completed (Yes in S11), the controller 5 registers the block in which the write has been completed to the block set with the remaining time of 24 hours (S12).

Figure 16:
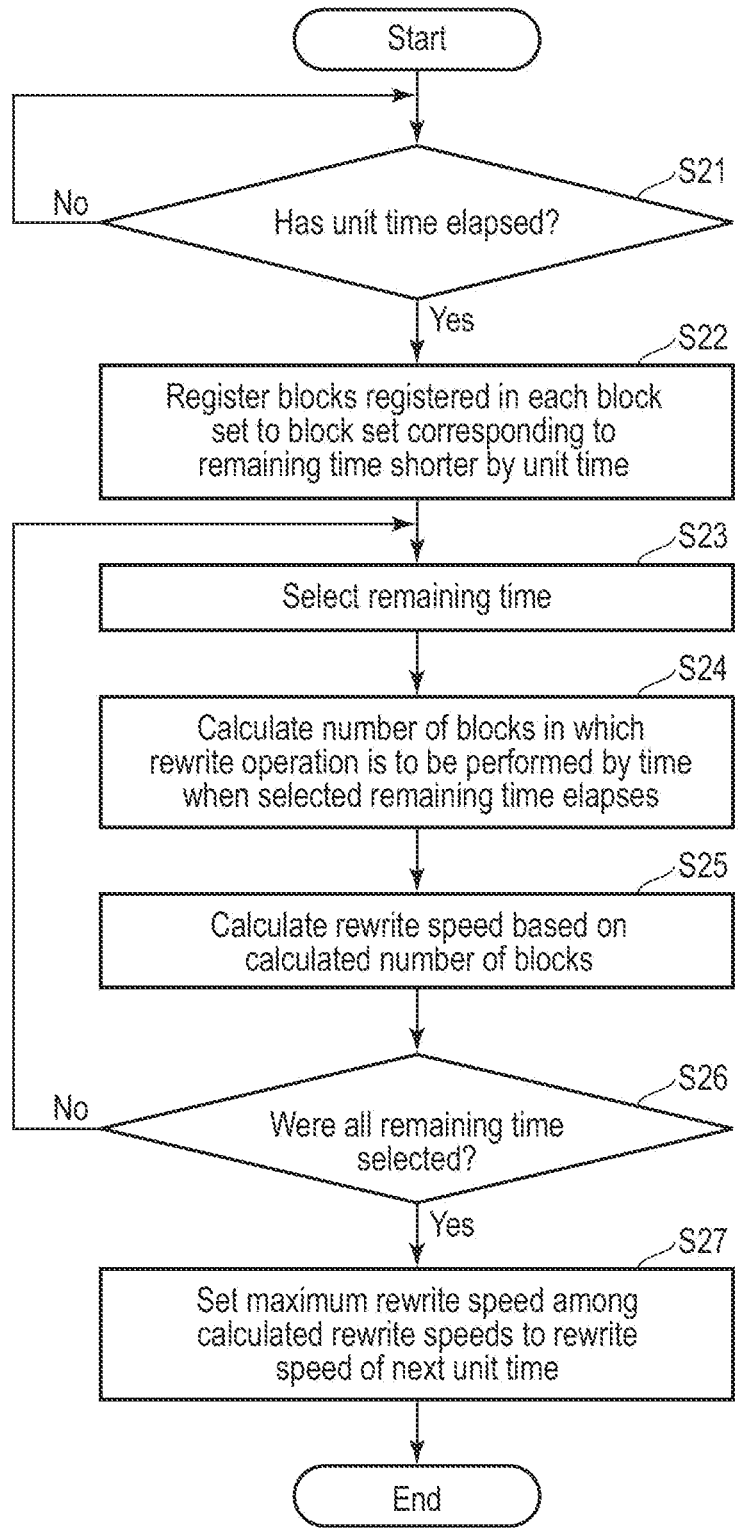
FIG. 16 is a flowchart illustrating a procedure of processing of setting the rewrite speed for each unit time, which is performed in the memory system according to the embodiment.

Next, processing of setting the rewrite speed for each unit time will be described. FIG. 16 is a flowchart illustrating a procedure of the processing of setting the rewrite speed for each unit time, which is performed in the memory system 3 according to the embodiment.

The controller 5 determines whether the unit time has elapsed (S21). The controller 5 determines whether the unit time has elapsed from a time point when it has been determined that the unit time has elapsed last time.

When the unit time has not elapsed (No in S21), the controller 5 waits until the unit time elapses.

When the unit time has elapsed (Yes in S21), the controller 5 registers the block registered in each block set to the block set corresponding to the remaining time shorter by the unit time (S22). The controller 5 selects the remaining time (S23).

The controller 5 may select the remaining time in order from the short remaining time, or may select any remaining time.

The controller 5 calculates the number of blocks in which the rewrite operation is to be performed by the time when the remaining time selected in S23 elapses (S24). The controller 5 obtains the number of blocks included in each block set corresponding to the remaining time less than or equal to the selected remaining time. Then, the controller 5 calculates the total number of obtained blocks.

The controller 5 calculates the rewrite speed based on the number of blocks calculated in S24 (S25). The controller 5 calculates the rewrite speed from the quotient of the number of blocks calculated in S24 and the remaining time selected in S23.

The controller 5 determines whether all the remaining times have been selected (S26). The controller 5 determines whether the rewrite speeds corresponding to all the remaining times have been calculated.

When all the remaining times have not been selected (No in S26), the controller 5 selects the remaining time again (S23). The controller 5 selects the remaining time that has not yet been selected.

When all the remaining times have been selected (Yes in S26), the controller 5 sets the maximum rewrite speed among the calculated rewrite speeds to the rewrite speed of next unit time (S27).

Figure 17:
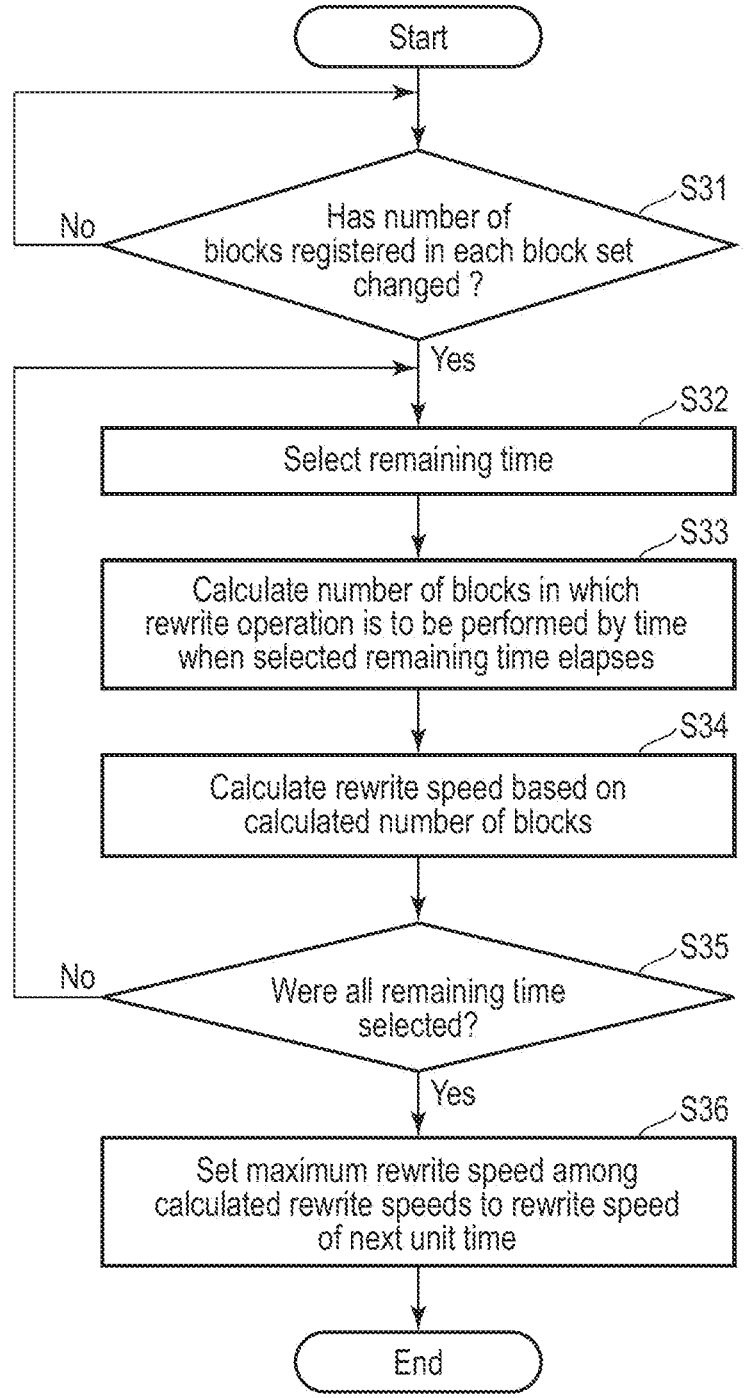
FIG. 17 is a flowchart illustrating a procedure for setting the rewrite speed when the number of blocks included in the block set changes, which is performed in the memory system according to the embodiment.

Next, an operation of setting the rewrite speed when the number of blocks included in the block set changes will be described. FIG. 17 is a flowchart illustrating a procedure for setting the rewrite speed when the number of blocks included in the block set changes, which is performed in the memory system 3 according to the embodiment.

The controller 5 determines whether the number of blocks registered in each block set has changed (S31). The controller 5 determines whether any active block becomes the free block and the number of blocks registered in each block set has changed, by the overwrite by the write command received from the host 2, or the invalidation command.

When there is no change in the number of blocks registered in each block set (No in S31), the controller 5 waits until the number of blocks registered in each block set changes.

When there is a change in the number of blocks registered in each block set (Yes in S31), the controller 5 selects the remaining time (S32). In operations from S32 to S36, the controller 5 performs the same operations as the operations from S23 to S27 described in FIG. 16. Therefore, description of the procedure of the subsequent operations will be omitted here.

Figure 18:
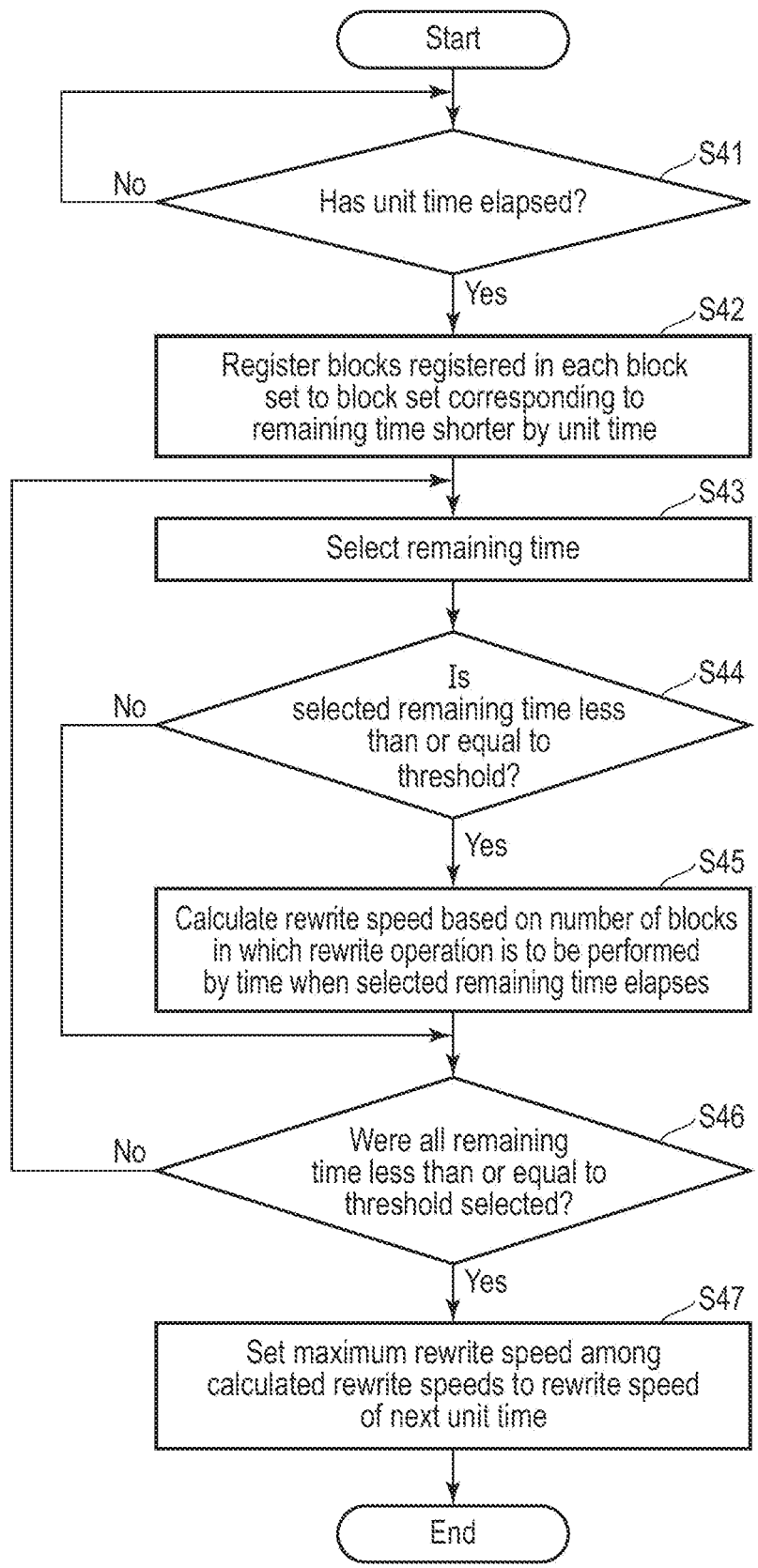
FIG. 18 is a flowchart illustrating a procedure of processing of setting the rewrite speed for each unit time when the threshold is set, which is performed in the memory system according to the embodiment.

Next, the processing of setting the rewrite speed for each unit time when the threshold is set will be described. FIG. 18 is a flowchart illustrating a procedure of the processing of setting the rewrite speed for each unit time when the threshold is set, which is performed in the memory system 3 according to the embodiment.

The controller 5 determines whether the unit time has elapsed (S41). In operations from S41 to S43, the controller 5 performs the same operations as the operations from S21 to S23 described in FIG. 16. Therefore, description of the procedure of the operations from S41 to S43 will be omitted here.

The controller 5 determines whether the remaining time selected in S43 is less than or equal to the threshold (S44).

When the remaining time selected in S43 is less than or equal to the threshold (Yes in S44), the controller 5 calculates the rewrite speed based on the number of blocks in which the rewrite operation is to be performed by the time when the remaining time selected in S43 elapses (S45). The controller 5 calculates the number of blocks in which the rewrite operation is to be performed by the time when the remaining time selected in S43 elapses. The controller 5 calculates the rewrite speed from the quotient of the number of blocks calculated and the remaining time selected.

When the remaining time selected in S43 is greater than the threshold (No in S44), the controller 5 skips a procedure of calculating the rewrite speed in S45.

The controller 5 determines whether all the remaining times less than or equal to the threshold have been selected (S46).

When there is the remaining time that has not yet been selected among the remaining times less than or equal to the threshold (No in S46), the controller 5 selects the remaining time again (S43). The controller 5 selects the remaining time that has not yet been selected among the remaining times less than or equal to the threshold.

When all the remaining times less than or equal to the threshold have been selected (Yes in S46), the controller 5 sets the maximum rewrite speed among the calculated rewrite speeds to the rewrite speed of the next unit time (S47).

Similarly to the case of FIG. 17, when the number of blocks registered in each block set changes, the controller 5 may perform the operations from S43 to S47.

Figure 19:
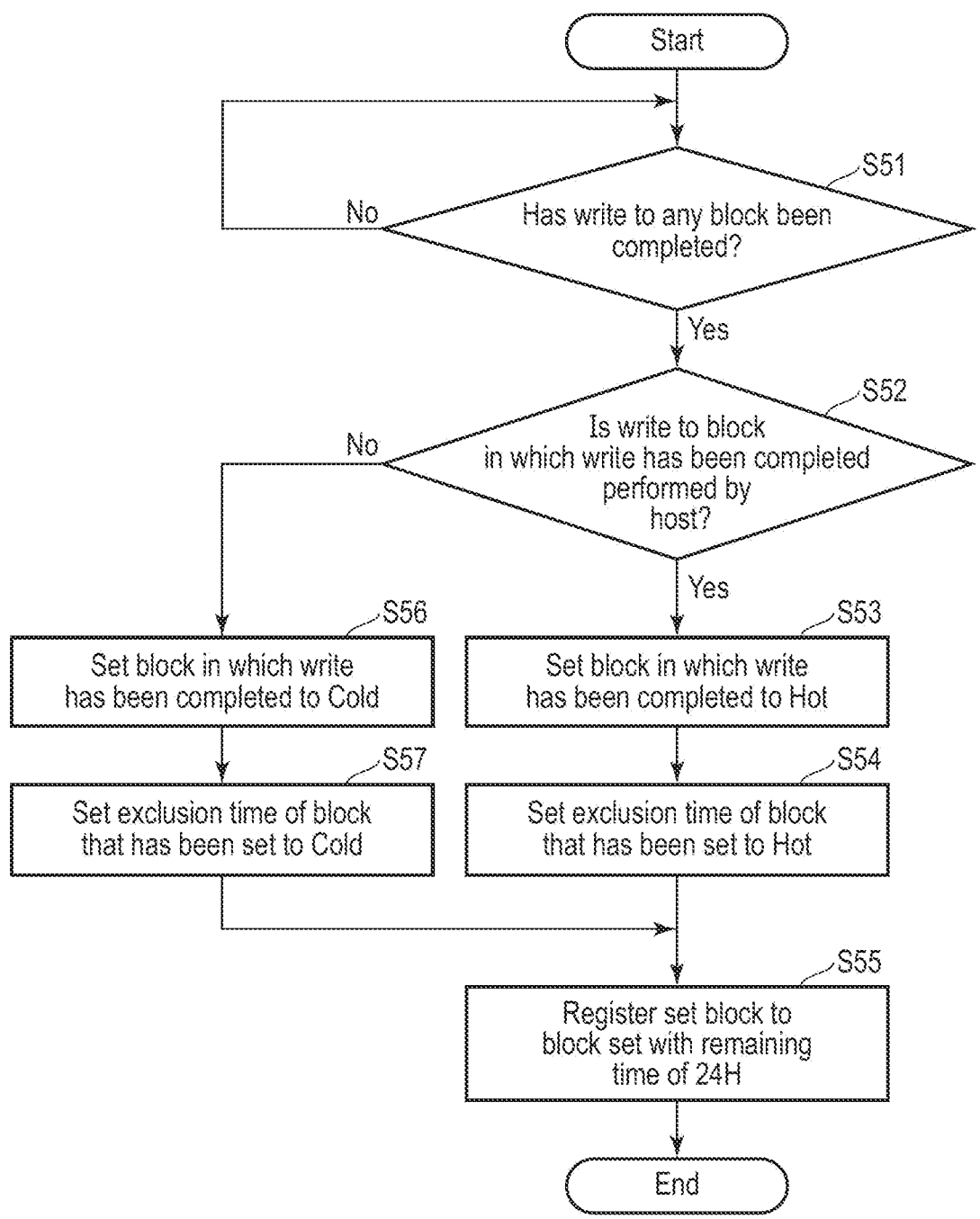
FIG. 19 is a flowchart illustrating a procedure of block registration processing when a hot or cold attribute is set to the block, which is performed in the memory system according to the embodiment.

Next, a procedure for registering the block to the block set when the attribute is set to each block will be described. FIG. 19 is a flowchart illustrating a procedure of block registration processing when a hot or cold attribute is set in the block, which is performed in the memory system 3 according to the embodiment.

The controller 5 determines whether the write to any block has been completed (S51).

When the write to any block is not completed (No in S51), the controller 5 waits until the write to any block is completed.

When the write to one of the blocks is completed (Yes in S51), the controller 5 determines whether write to the block in which the write has been completed is performed by the host 2 (S52). The controller 5 determines whether the write to the block is according to the write command received from the host 2.

When the write to the block in which the write is completed is the write by the host 2 (Yes in S52), the controller 5 sets the block in which the write has been completed to Hot (S53). The controller 5 updates the block management table 74 and sets the attribute of the block to Hot.

The controller 5 sets the exclusion time of the block that has been set to Hot (S54). The controller 5 sets the exclusion time of the block with reference to the threshold corresponding to the block storing the hot data.

The controller 5 registers the set block to the block set with the remaining time of 24 hours (S55).

When the write to the block in which the write is completed is not the write by the host 2 (No in S52), that is, when the write to the block in which the write is completed is the migration of the data by the garbage collection operation or the rewrite operation, the controller 5 sets the block in which the write has been completed to Cold (S56). The controller 5 updates the block management table 74 and sets the attribute of the block to Cold.

The controller 5 sets the exclusion time of the block that has been set to Cold (S57). The controller 5 sets the exclusion time of the block with reference to the threshold corresponding to the block storing the cold data.

The controller 5 registers the set block to the block set with the remaining time of 24 hours (S55).

Next, the processing of setting the rewrite speed for each unit time when the attribute is set in each block will be described. FIG. 20 is a flowchart illustrating a procedure of rewrite speed setting processing when the attribute is set in the block, which is performed in the memory system 3 according to the embodiment.

The controller 5 determines whether the unit time has elapsed (S61). In operations from S61 to S64, the controller 5 performs the same operations as the operations from S21 to S24 described in FIG. 16. Therefore, description of the procedure of the operations from S61 to S64 will be omitted here.

The controller 5 subtracts the number of blocks not registered to the block set corresponding to the remaining time less than or equal to the threshold from the number of blocks calculated in S64 (S65). The controller 5 excludes the block included in the block set corresponding to the remaining time greater than the threshold from the calculation of the rewrite speed, among the blocks included in the block set corresponding to the remaining time less than or equal to the selected remaining time.

The controller 5 calculates the rewrite speed based on the number of blocks calculated (S66).

The controller 5 determines whether all the remaining times have been selected (S67). The controller 5 may determine whether all the remaining times less than or equal to the maximum threshold among the thresholds have been selected.

When all the remaining times have not been selected (No in S67), the controller 5 selects the remaining time that has not yet been selected (S63).

When all the remaining times have been selected (Yes in S67), the controller 5 sets the maximum rewrite speed among the calculated rewrite speeds to the rewrite speed of the next unit time (S68).

Similarly to the case of FIG. 17, when the number of blocks registered in each block set changes, the controller 5 may perform the operations from S63 to S68.

Figure 21:
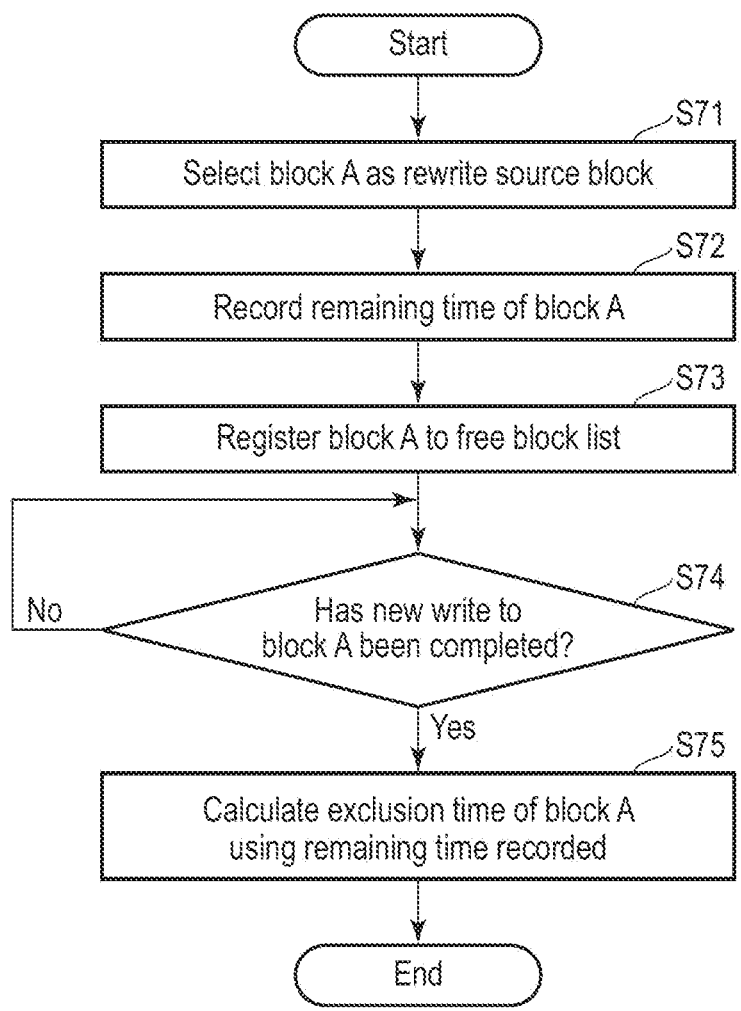
FIG. 21 is a flowchart illustrating a procedure of processing of setting an exclusion time for a specific block, which is performed in the memory system according to the embodiment.

Next, a procedure of a processing of setting the exclusion time for a specific block will be described. FIG. 21 is a flowchart illustrating a procedure of processing of setting the exclusion time for a specific block, which is performed in the memory system 3 according to the embodiment. In the processing, the controller 5 performs the rewrite operation.

The controller 5 selects a block A as the rewrite source block (S71).

The controller 5 records the remaining time of the block A (S72).

After performing the rewrite operation on the block A, the controller 5 registers the block A to the free block list 73 (S73). Thus, the block A becomes a block that can be newly written.

The controller 5 determines whether a new write to the block A has been completed (S74).

When the new write to the block A is not completed (No in S74), the controller 5 waits until the new write to the block A is completed.

When the new write to the block A is completed (Yes in S74), the controller 5 calculates the exclusion time of the block A using the remaining time recorded in S72 (S75). The controller 5 sets a difference (six hours) between the cycle of the rewrite operation (24 hours) and the recorded remaining time (for example, 18 hours) to the exclusion time of the block A. In this case, the block A will be excluded from the target of the rewrite operation until the block A is included in the block set with the remaining time of six hours.

Figure 22:
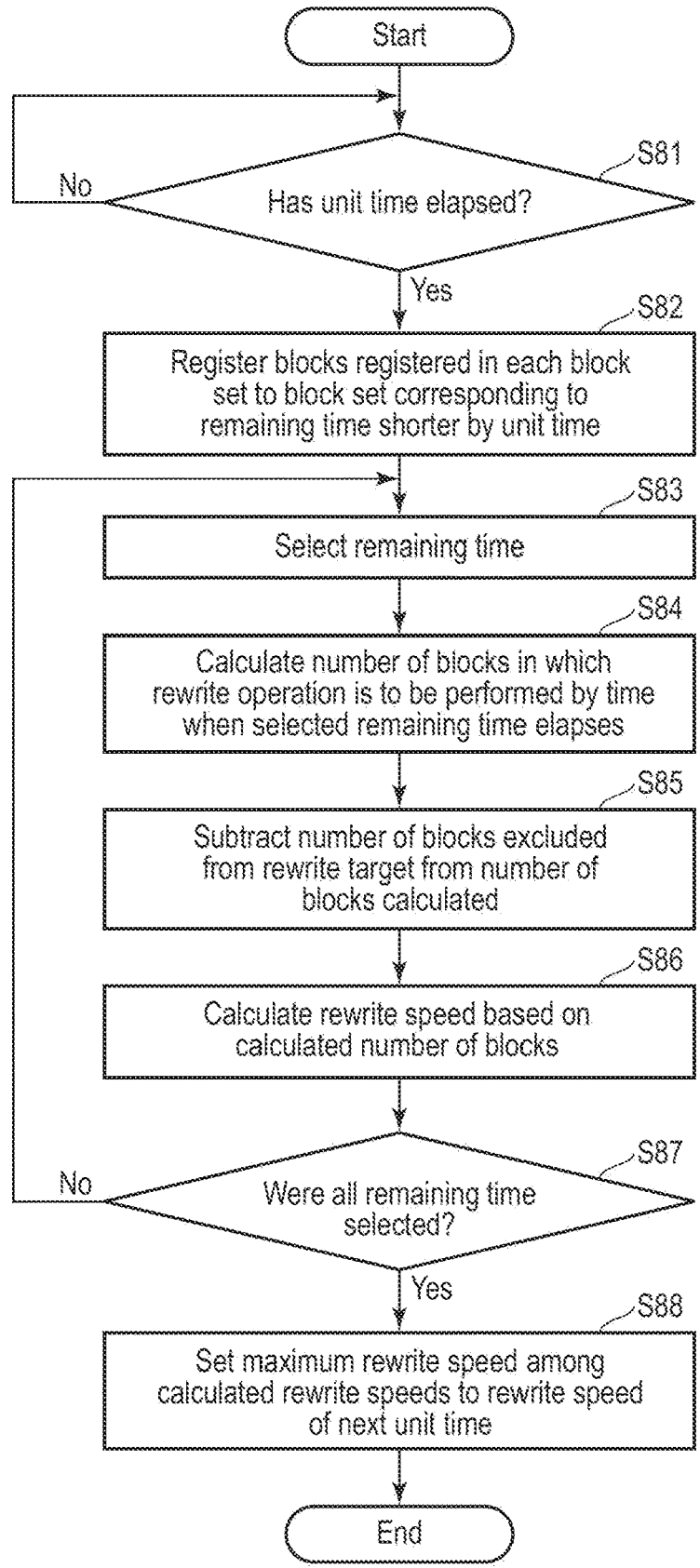
FIG. 22 is a flowchart illustrating a procedure of the rewrite speed setting processing when the exclusion time is set for a specific block, which is performed in the memory system according to the embodiment.

Next, the processing of setting the rewrite speed for each unit time when the exclusion time is set for a specific block will be described. FIG. 22 is a flowchart illustrating a procedure of the rewrite speed setting processing when the exclusion time is set for a specific block, which is performed in the memory system 3 according to the embodiment.

The controller 5 determines whether the unit time has elapsed (S81). In operations from S81 to S84, the controller 5 performs the same operations as the operations from S21 to S24 described in FIG. 16. Therefore, description of the procedure of the operations from S81 to S84 will be omitted here.

The controller 5 subtracts the number of blocks excluded from the rewrite target from the number of blocks calculated in S84 (S85). The controller 5 excludes a block having a remaining time longer than the exclusion time from the blocks in which the rewrite operation is to be performed.

The controller 5 calculates the rewrite speed based on the number of blocks calculated in S85 (S86). The controller 5 calculates the rewrite speed from the quotient of the number of blocks calculated in S85 and the remaining time selected in S83.

The controller 5 determines whether all the remaining times have been selected (S87). The controller 5 may determine whether all the remaining times less than or equal to the maximum threshold among the thresholds have been selected.

When all the remaining times have not been selected (No in S87), the controller 5 selects the remaining time that has not yet been selected (S83).

When all the remaining times have been selected (Yes in S87), the controller 5 sets the maximum rewrite speed among the calculated rewrite speeds to the rewrite speed of the next unit time (S88).

Similarly to the case of FIG. 17, when the number of blocks registered in each block set changes, the controller 5 may perform the operations from S83 to S88.

Next, setting of a waiting time for reading the data stored in the page of the rewrite source block and for writing the data to the page of the rewrite destination block will be described. FIG. 23 is a flowchart illustrating a procedure of processing of setting the waiting time when reading the data stored in the page of the rewrite source block and writing the data to the page of the rewrite destination block, which is performed in the memory system 3 according to the embodiment.

The controller 5 selects the block A as the rewrite source block which is the rewrite target block (S91).

The controller 5 selects an arbitrary page of the block A (S92).

The controller 5 issues the read command corresponding to the page selected in S92 (S93). The controller 5 transmits the read command instructing to read the selected page to the NAND memory 6.

The controller 5 selects a block B as the rewrite destination block to which the data is to be written by the rewrite operation (S94).

The controller 5 selects an arbitrary page of the block B (S95).

The controller 5 issues the write command corresponding to the page of the block B selected in S95 (S96). The controller 5 transmits, to the NAND memory 6, the write command instructing to write the data instructed to be read in S93 to the selected page of the block B.

The controller 5 waits for a certain period (S97). The controller 5 gives an interval from issuing the read command corresponding to the page selected in S92 to issuing the read command instructing to read the next page.

The controller 5 determines whether the rewrite for the block A has been completed (S98).

When the rewrite for the block A is completed (Yes in S98), the controller 5 ends the rewrite operation on the block A.

When the rewrite for the block A is not completed (No in S98), the controller 5 selects another arbitrary page of the block A again (S92). The controller 5 selects a page that has not yet been selected among the pages included in the block A.

Figure 24:
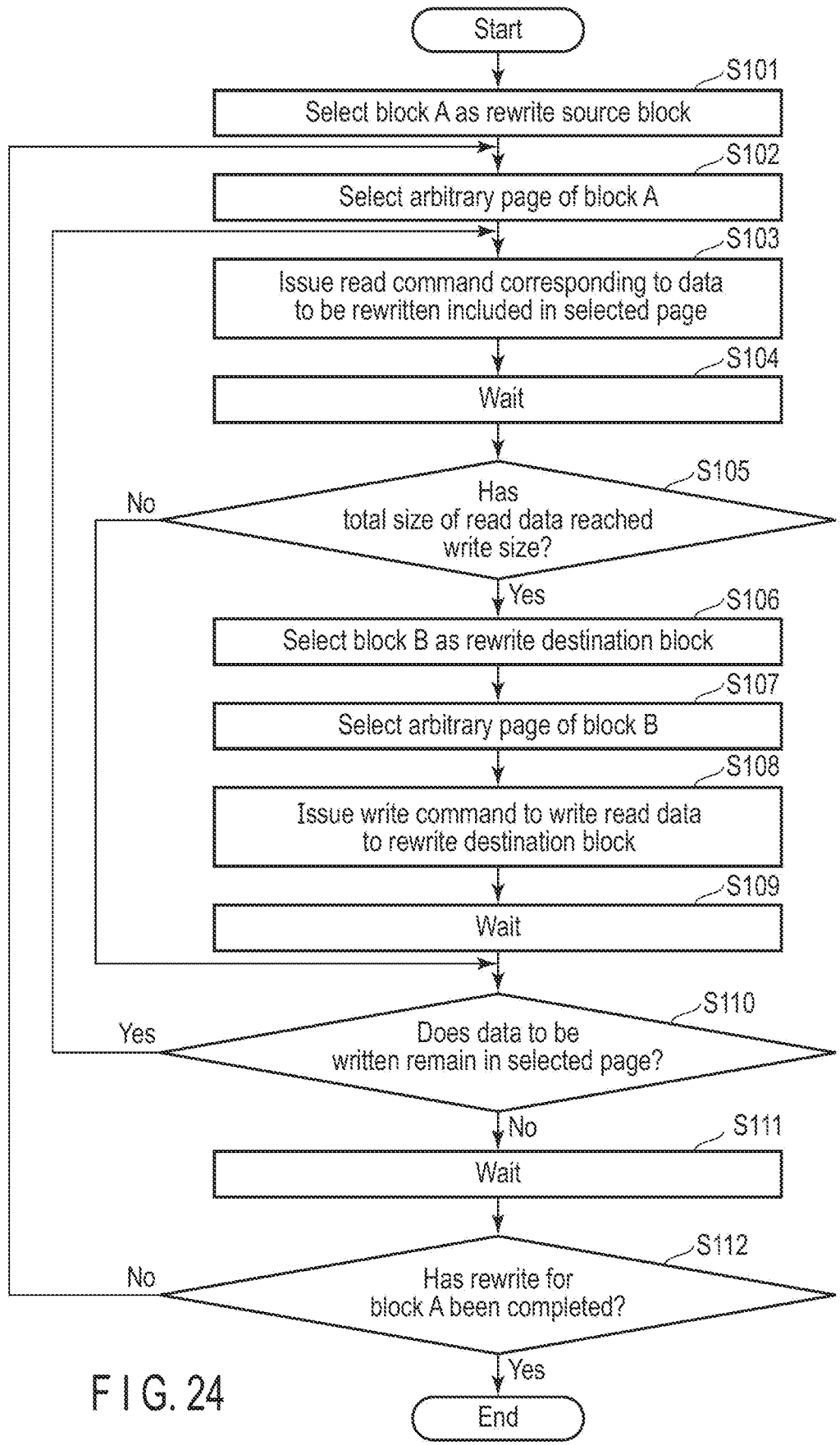
FIG. 24 is a flowchart illustrating a procedure of processing of setting the waiting time, when reading data stored in a page of the rewrite source block and writing data to a page of the rewrite destination block, and of setting a waiting time when issuing a read command and a write command, in the rewrite operation performed in the memory system according to the embodiment.

Next, the setting of the waiting time for reading the data stored in the page of the rewrite source block and for writing the data to the page of the rewrite destination block, and setting of a waiting time for issuing the read command and the write command will be described. FIG. 24 is a flowchart illustrating a procedure of the processing of setting the waiting time, when reading the data stored in the page of the rewrite source block and writing the data to the page of the rewrite destination block, and of setting the waiting time when issuing the read command and the write command, in the rewrite operation performed in the memory system 3 according to the embodiment.

The controller 5 selects the block A as the rewrite source block which is the rewrite target block (S101).

The controller 5 selects an arbitrary page of the block A (S102).

The controller 5 issues the read command corresponding to data to be rewritten included in the page selected in S102 (S103). The controller 5 transmits the read command for designating the data to be rewritten to the NAND memory 6.

The controller 5 waits for a certain period (S104). The controller 5 sets the waiting time in response to the read command being issued.

The controller 5 determines whether the total size of the read data has reached the write size (S105). The controller 5 determines, for example, whether the total size of the data in units of 4 KB read by the read command has reached 16 KB which is the write size.

When the total size of the read data reaches the write size (Yes in S105), the controller 5 selects the block B as the rewrite destination block to which the data is to be written by the rewrite operation (S106).

The controller 5 selects an arbitrary page of the block B (S107).

The controller 5 issues the write command instructing to write the read data to the page of the block B selected in S107 (S108). The controller 5 transmits, for example, the write command instructing to write the data in units of 16 KB, to the NAND memory 6.

The controller 5 waits for a certain period (S109). The controller 5 sets the waiting time in response to the write command being issued.

When the total size of the read data does not reach the write size (No in S105), the controller 5 skips procedures of S106 to S109.

The controller 5 determines whether the data to be rewritten remains in the page of the block A selected in S102 (S110). The controller 5 determines, for example, whether there is data that has not yet been read in the page of the block A selected in S102.

Alternatively, the controller 5 determines, for example, whether there is valid data that has not yet been read in the page of the block A selected in S102.

When the data to be rewritten remains in the selected page (Yes in S110), the controller 5 issues the read command corresponding to the data to be rewritten remaining in the selected page (S103).

When the data to be rewritten does not remain in the selected page (No in S110), the controller 5 waits for a certain period (S111). The controller 5 sets the waiting time in response to completion of the rewrite operation on the page selected in S102.

The controller 5 determines whether the rewrite for the block A has been completed (S112).

When the rewrite for the block A is not completed (No in S112), the controller 5 selects an arbitrary page of the block A again (S102). The controller 5 selects a page that has not yet been selected among the pages included in the block A.

When the rewrite for the block A is completed (Yes in S112), the controller 5 ends the rewrite operation on the block A.

As described above, according to the present embodiment, the rewrite speed is set to the maximum rewrite speed among the rewrite speeds calculated based on each remaining time and the total number of blocks included in the block set corresponding to the remaining time less than or equal to the remaining time.

Therefore, the controller 5 can calculate the rewrite speed in consideration of the remaining time until a time point at which the rewrite operation is to be performed for each of the managed active blocks. By selecting the maximum rewrite speed from among the calculated rewrite speeds, the controller 5 prevents the rewrite operation from not being performed for the managed active block by the remaining time. When the number of active blocks is small, the controller 5 can set a low value of the rewrite speed.

In addition, the controller 5 performs, for each unit time, an operation of registering the block included in each block set to the block set corresponding to the remaining time shorter by the unit time, and setting of the rewrite speed. The controller 5 sets the rewrite speed when the number of blocks included in each block set changes.

Thus, the controller 5 can adjust the rewrite speed in response to an increase or decrease in the number of managed active blocks.

In addition, the controller 5 excludes the block included in the block set corresponding to the remaining time greater than the threshold from the target of the rewrite operation. That is, the controller 5 selects the block set corresponding to the remaining time less than or equal to the threshold, and calculates the rewrite speed. Then, the controller 5 determines the maximum rewrite speed from the calculated rewrite speeds.

The controller 5 can prevent the rewrite operation from being performed for the block immediately after the data is written. This prevents the number of program/erase cycles of the block from unnecessarily increasing due to the rewrite operation being unnecessarily performed.

In addition, the controller 5 can set the first threshold corresponding to the block storing the hot data and the second threshold corresponding to the block storing the cold data to different values.

Thus, the controller 5 can delay the time point at which the block storing the hot data that is more likely to become the invalid data is selected as the target of the rewrite operation, by the overwrite by the write command received from the host 2, and the invalidation command.

In addition, the controller 5 records the remaining time of the block selected as the rewrite source block. When the block becomes the active block again after performing the rewrite operation, the controller 5 excludes the block from the target of the rewrite operation until the recorded remaining time elapses.

Thus, the controller 5 can prevent only a specific block from being repeatedly selected as the target of the rewrite operation in a short cycle. Then, the controller 5 can level the number of program/erase cycles of the blocks included in the NAND memory 6.

In addition, the controller 5 sets the waiting time when the processing on the page included in the rewrite source block is completed. The controller 5 sets the waiting time when transmitting the read command for designating the data of the rewrite source block. Then, the controller 5 sets the waiting time when transmitting the write command to write the data read from the rewrite source block.

Thus, the controller 5 can avoid intensively performing the rewrite operation in a short period, and can stabilize the performance of the memory system 3 without disturbing the operation by the I/O command received from the host 2.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:
a nonvolatile memory including a plurality of blocks; and
a controller configured to perform a rewrite operation of rewriting data stored in each block including valid data to another block among the plurality of blocks, wherein the controller is configured to:
manage a first block set and a second block set respectively corresponding to a first remaining time and a second remaining time that are respectively represented by multiples of a unit time, the first block set being a set of blocks in which a remaining time, until a time point at which the rewrite operation is to be performed, is the first remaining time, the second block set being a set of blocks in which a remaining time, until the time point at which the rewrite operation is to be performed, is the second remaining time which is longer than the first remaining time, and the time point at which the rewrite operation is to be performed being a time point after a certain period has elapsed since the data is written to the block;
calculate a first rewrite speed based on the first remaining time and a first number of blocks included in the first block set;
calculate a second rewrite speed based on the second remaining time and a sum of i) the first number of blocks and ii) a second number of blocks included in the second block set;
determine a maximum rewrite speed among the first rewrite speed and the second rewrite speed; and
perform, at the determined maximum rewrite speed, the rewrite operation on i) the first number of blocks included in the first block set and ii) the second number of blocks included in the second block set.

2. The memory system according to claim 1, wherein the controller is configured to:
each time the unit time elapses,
calculate the first rewrite speed based on the first remaining time and the first number of blocks included in the first block set;
calculate the second rewrite speed based on the second remaining time and the sum of i) the first number of blocks and ii) the second number of blocks included in the second block set;
determine the maximum rewrite speed among the first rewrite speed and the second rewrite speed; and
perform, at the determined maximum rewrite speed, the rewrite operation on i) the first number of blocks included in the first block set and ii) the second number of blocks included in the second block set.

3. The memory system according to claim 1, wherein the controller is configured to:
in response to a change in the first number of blocks included in the first block set or the second number of blocks included in the second block set,
calculate the first rewrite speed based on the first remaining time and the first number of blocks included in the first block set;
calculate the second rewrite speed based on the second remaining time and the sum of i) the first number of blocks and ii) the second number of blocks included in the second block set;
determine the maximum rewrite speed among the first rewrite speed and the second rewrite speed; and
perform, at the determined maximum rewrite speed, the rewrite operation on i) the first number of blocks included in the first block set and ii) the second number of blocks included in the second block set.

4. The memory system according to claim 1, wherein the controller is configured to:
manage a third block set corresponding to a third remaining time represented by a multiple of the unit time, the third block set being a set of blocks in which a remaining time, until the time point at which the rewrite operation is to be performed, is the third remaining time which is longer than the second remaining time;
set a threshold;
when the first remaining time and the second remaining time are less than or equal to the threshold, and the third remaining time is greater than the threshold,
calculate the first rewrite speed and the second rewrite speed;
determine the maximum rewrite speed among the first rewrite speed and the second rewrite speed; and
perform, at the determined maximum rewrite speed, the rewrite operation on i) the first number of blocks included in the first block set and ii) the second number of blocks included in the second block set.

5. The memory system according to claim 1, wherein the controller is configured to:
set a first threshold related to a block storing hot data among the plurality of blocks;
set a second threshold related to a block storing cold data among the plurality of blocks; and
when the first remaining time is less than or equal to the first threshold and the second threshold, and the second remaining time is i) greater than the first threshold and ii) less than or equal to the second threshold,
calculate a third rewrite speed based on i) the first remaining time, and ii) a third number of blocks, included in the first block set, storing the hot data and the cold data;
calculate a fourth rewrite speed based on the second remaining time and a sum of i) the third number of blocks and ii) a fourth number of blocks, included in the second block set, storing the cold data;
determine a new maximum rewrite speed among the third rewrite speed and the fourth rewrite speed; and
perform, at the determined new maximum rewrite speed, the rewrite operation on i) the third number of blocks included in the first block set and ii) the fourth number of blocks included in the second block set and storing the cold data.

6. The memory system according to claim 1, wherein the controller is configured to:
record a first time that is a remaining time until a time point at which a first rewrite operation, on a first block included in the plurality of blocks, is to be performed;
perform, before the first time elapses, the first rewrite operation on the first block; and
after the first rewrite operation is performed, in a calculation of a new rewrite speed, exclude the first block from a first number of blocks included in a block set, the first block is excluded during a period from when the valid data is stored again into the first block until the first time elapses, and calculate the new rewrite speed based on the first number of blocks other than the first block.

7. The memory system according to claim 1, wherein the controller is configured to:
when performing a rewrite operation on a first block included in the plurality of blocks,
set a waiting time each time processing on a page is performed, the processing including i) a page read operation for reading data from the first block and ii) a page write operation for writing data to the other block.

8. The memory system according to claim 1, wherein the controller is configured to:
when performing a rewrite operation on a first block included in the blocks,
set a first waiting time each time a read command, for reading data from the first block, is transmitted to the nonvolatile memory; and
set a second waiting time each time a write command, for writing data read from the first block to the other block, is transmitted to the nonvolatile memory.

9. A memory system comprising:
a nonvolatile memory including a plurality of blocks; and
a controller configured to perform a rewrite operation of rewriting data stored in each block including valid data to another block among the plurality of blocks, wherein
the controller is configured to:
manage a remaining time until a time point at which the rewrite operation is to be performed on each of the block including the valid data, the time point at which the rewrite operation is to be performed being a time point after a certain period has elapsed since the data is written to the block;
obtain i) a first number of blocks included in a first block set in which a remaining time, until the time point at which the rewrite operation is to be performed, is a first time and ii) a second number of blocks included in a second block set in which a remaining time, until the time point at which the rewrite operation is to be performed, is a second time longer than the first time, the first time and the second time being represented by multiples of a unit time;

calculate a first rewrite speed based on the first time and the first number of blocks;

calculate a second rewrite speed based on the second time and a sum of i) the first number of blocks and ii) the second number of blocks;

determine a maximum rewrite speed among the first rewrite speed and the second rewrite speed; and perform, at the determined maximum rewrite speed, the rewrite operation on i) the first number of blocks included in the first block set and ii) the second number of blocks included in the second block set.

10. The memory system according to claim 9, wherein the controller is configured to:

each time the unit time elapses, obtain i) the first number of blocks included in the first block set and ii) the second number of blocks included in the second block set;

calculate the first rewrite speed based on the first time and the obtained first number; and calculate the second rewrite speed based on the second time and the sum of i) the obtained first number and ii) the obtained second number.

11. The memory system according to claim 9, wherein the controller is configured to:

set a first threshold related to a block storing hot data among the plurality of blocks;

set a second threshold related to a block storing cold data among the plurality of blocks;

when the first time is less than or equal to the first threshold and the second threshold, and the second time is i) greater than the first threshold and ii) less than or equal to the second threshold, calculate a third rewrite speed based on i) the first time, and ii) a third number of blocks, included in the first block set, storing the hot data and the cold data;

calculate a forth rewrite speed based on the second time and a sum of i) the third number of blocks and ii) a forth number of blocks, included in the second block set, storing the cold data;

determine a new maximum rewrite speed among the third rewrite speed and the forth rewrite speed; and perform, at the determined new maximum rewrite speed, the rewrite operation on i) the third number of blocks included in the first block set and ii) the forth number of blocks included in the second block set and storing the cold data.

12. The memory system according to claim 9, wherein the controller is configured to:

when performing a rewrite operation on a first block included in the plurality of blocks, set a waiting time each time processing on a page is performed, the processing including i) a page read operation for reading data from the first block and ii) a page write operation for writing data to the other block.

13. A method of performing a rewrite operation of rewriting data stored in each block including valid data to another block among a plurality of blocks included in a nonvolatile memory, the method comprising:

managing a first block set and a second block set respectively corresponding to a first remaining time and a second remaining time that are respectively represented by multiples of a unit time, the first block set being a set of blocks in which a remaining time, until a time point at which the rewrite operation is to be performed, is the first remaining time, the second block set being a set of blocks in which a remaining time, until the time point at which the rewrite operation is to be performed, is the second remaining time which is longer than the first remaining time, and the time point at which the rewrite operation is to be performed being a time point after a certain period has elapsed since the data is written to the block;

calculating a first rewrite speed based on the first remaining time and a first number of blocks included in the first block set;

calculating a second rewrite speed based on the second remaining time and a sum of i) the first number of blocks and ii) a second number of blocks included in the second block set;

determining a maximum rewrite speed among the first rewrite speed and the second rewrite speed; and performing, at the determined maximum rewrite speed, the rewrite operation on i) the first number of blocks included in the first block set and ii) the second number of blocks included in the second block set.

14. The method according to the claim 13, further comprising:

each time the unit time elapses, calculating the first rewrite speed based on the first remaining time and the first number of blocks included in the first block set;

calculating the second rewrite speed based on the second remaining time and the sum of i) the first number of blocks included in the first block set and ii) the second number of blocks included in the second block set;

determining the maximum rewrite speed among the first rewrite speed and the second rewrite speed; and performing, at the determined maximum rewrite speed, the rewrite operation on i) the first number of blocks included in the first block set and ii) the second number of blocks included in the second number of blocks.

15. The method according to the claim 13, further comprising:

detecting a change in the first number of blocks included in the first block set or the second number of blocks included in the second block set;

in response to detecting the change in the first number of blocks included in the first block set or the second number of blocks, calculating the first rewrite speed based on the first remaining time and the first number of blocks included in the first block set;

calculating the second rewrite speed based on the second remaining time and the sum of i) the first number of blocks included in the first block set and ii) the second number of blocks included in the second block set;

determining the maximum rewrite speed among the first rewrite speed and the second rewrite speed; and performing, at the determined maximum rewrite speed, the rewrite operation on i) the first number of blocks included in the first block set and ii) the second number of blocks included in the second number of blocks.

16. The method according to the claim 13, further comprising:

managing a third block set corresponding to a third remaining time represented by a multiple of the unit time, the third block set being a set of blocks in which a remaining time, until the time point at which the rewrite operation is to be performed, is the third remaining time which is longer than the second remaining time;

setting threshold;
determining that the first remaining time and the second remaining time are less than or equal to the threshold, and the third remaining time is greater than the threshold;
in response to determining that the first remaining time and the second remaining time are less than or equal to the threshold, and the third remaining time is greater than the threshold,
calculating the first rewrite speed, and the second rewrite speed;
determining the maximum rewrite speed of the first rewrite speed and the second rewrite speed; and
performing, at the determined maximum rewrite speed, the rewrite operation on i) the first number of blocks included in the first block set and ii) the second number of blocks included in the second block set.

17. The method according to the claim 13, further comprising:
setting a first threshold related to a block storing hot data among the plurality of blocks;
setting a second threshold related to a block storing cold data among the plurality of blocks;
determining that the first remaining time is less than the first threshold and the second threshold, and the second remaining time is i) greater than the first threshold and ii) less than or equal to the second threshold;
in response to determining that the first remaining time is less than the first threshold and the second threshold, and the second remaining time is i) greater than the first threshold and ii) less than or equal to the second threshold,
calculating a third rewrite speed based on i) the first remaining time and ii) a third number of blocks, included in the first block set, storing the hot data and the cold data;
calculating a forth rewrite speed based on the second remaining time and a sum of i) the third number of blocks and ii) a forth number of blocks, included in the second block set storing the cold data;
determining a new maximum rewrite speed among the third rewrite speed and the forth rewrite speed; and
performing, at the determined new maximum rewrite speed, the rewrite operation on i) the third number of blocks included in the first block set and ii) the forth number of blocks included in the second block set and storing the cold data.

18. The method according to claim 13, further comprising:
recording a first time that is a remaining time until a time point at which a first rewrite operation, on a first block included in the plurality of blocks, is to be performed;
performing, before the first time elapses, the first rewrite operation on the first block; and
after the first rewrite operation is performed, in a calculation of a new rewrite speed, excluding the first block from a first number of blocks included in a block set, the first block is excluded during a period from when the valid data is stored again into the first block until the first time elapses, and calculating the new rewrite speed based on the first number of blocks other than the first block.

19. The method according to claim 13, further comprising:
when performing a rewrite operation on a first block included in the plurality of blocks,
setting a waiting time each time processing on a page is performed, the processing including i) a page read operation for reading data from the first block and ii) a page write operation for writing data to the other block.

20. The method according to claim 13, further comprising:
when performing a rewrite operation on a first block included in the blocks,
setting a first waiting time each time a read command, for reading data from the first block, is transmitted to the nonvolatile memory; and
setting a second waiting time each time a write command, for writing data read from the first block to the other block, is transmitted to the nonvolatile memory.

* * * * *